(12) United States Patent
Faltings

(10) Patent No.: US 7,962,346 B2
(45) Date of Patent: Jun. 14, 2011

(54) SOCIAL CHOICE DETERMINATION SYSTEMS AND METHODS

(75) Inventor: Boi Faltings, Preverenges (CH)

(73) Assignee: Fairnez Inc., Newark, DE (US)

( * ) Notice: Subject to any disclaimer, the term of this patent is extended or adjusted under 35 U.S.C. 154(b) by 1949 days.

(21) Appl. No.: 10/845,658

(22) Filed: May 14, 2004

(65) Prior Publication Data

US 2005/0065808 A1 Mar. 24, 2005

Related U.S. Application Data

(60) Provisional application No. 60/505,824, filed on Sep. 24, 2003, provisional application No. 60/559,257, filed on Apr. 1, 2004.

(51) Int. Cl.
*G06Q 99/00* (2006.01)
(52) U.S. Cl. ......................................................... 705/1
(58) Field of Classification Search ................. 705/1–45
See application file for complete search history.

(56) References Cited

U.S. PATENT DOCUMENTS

| 6,026,383 | A | 2/2000 | Ausubel | |
|---|---|---|---|---|
| 6,272,473 | B1 | 8/2001 | Sandholm | |
| 7,287,007 | B1 * | 10/2007 | Detering | 705/37 |
| 2003/0018561 | A1 * | 1/2003 | Kitchen et al. | 705/37 |
| 2003/0041002 | A1 | 2/2003 | Hao et al. | |

FOREIGN PATENT DOCUMENTS

EP 1 054 336 A2 11/2000

OTHER PUBLICATIONS

Rina Dechter, "Constraint Processing", Morgan Kaufmann Publishers, San Francisco, CA.
Nisan, Noam and Ronen, Amir, Computationally Feasible VCG Mechanisms, Article, School of Computer Science and Engineering, The Hebrew University of Jerusalem.
Ephrati, Eithan and Rosenschein, Jeffrey S., The Clarke Tax as a Consensus Mechanism Among Automated Agents, pp. 73-178,. Computer Science Department, Hebrew University.
Herve Moulin, Axioms of Cooperative Decision Making (Econometric Society Monographs, No. 15), Book, 1988, Entire Book, Press Syndicate of the University of Cambridge, New York.

* cited by examiner

*Primary Examiner* — Rajesh Khattar
(74) *Attorney, Agent, or Firm* — Brient Intellectual Property Law, LLC

(57) ABSTRACT

A system configured for: (A) identifying a first party of a plurality of parties as one of an excluded group of parties; (B) identifying a candidate group that includes each of the plurality of parties other than the excluded group of parties; (C) receiving, from the first party, a first-party utility value that the first party would associate with at least one of a plurality of different outcomes; (D) receiving, from a second party, a second-party utility value that the second party would associate with at least one of the plurality of different outcomes, the second party being part of the candidate group; and (E) determining which particular one of the plurality of outcomes should be selected based primarily on a set of utility values that comprises the second-party utility value. Step (E) may be made without substantially considering the first-party utility value, and Step (B) may be made without substantially considering the first-party utility value.

15 Claims, 11 Drawing Sheets

SOCIAL CHOICE DETERMINATION SYSTEMS AND METHODS

CROSS-REFERENCE TO RELATED APPLICATIONS

This application clams priority from: (1) U.S. provisional patent application No. 60/505,824, which was filed on Sep. 24, 2003 and entitled "Budget-Balanced Schemes for Incentive-Compatibility in Distributed Constraint Optzimization"; and (2) U.S. provisional patent application No. 60/559,257, which was filed on Apr. 1, 2004 and entitled "A Budget Balanced, Incentive Compatible Scheme For Social Choice". Both of these applications are hereby incorporated by reference.

BACKGROUND OF THE INVENTION

For the benefit of the reader, a numbered list of several related references is included below. Several of these references are referred to below using one or more bracketed numbers. For example, listing [8] at the end of a particular sentence indicates that Reference 8, below, may be of relevance, for background purposes, to that particular sentence.

[1] K. J. Arrow: "Social Choices and Individual Values," Wiley and Sons, New York, 1963
[2] E. H. Clarke: "Multipart pricing of public goods," *Public Choice* 11, pp. 17-33, 1971
[3] R. Dechter: "Constraint Processing," Morgan-Kaufmann Publishers, 2003
[4] E. Ephrati and J. S. Rosenschein: "The Clarke tax as a consensus mechanism among automated agents," *Proceedings of the 9th National Conference on Artificial Intelligence*, pp. 173-178, San Jose, Calif., July 1991.
[5] J. Green, J. J. Laffont: "Incentives in public decision making," *Studies in Public Economics* 1, North-Holland, 1979
[6] T. Groves: "Incentives in Teams," *Econometrica* 41, pp. 617-663, 1973
[7] H. Moulin: "Axioms of Cooperative Decision-making," *Econometric Society Monographs* 15, Cambridge University Press, 1988
[8] R. B. Myerson, M. A. Satterthwaite: "Efficient Mechanisms for Bilateral Trading," *Journal of Economic Theory* 29, pp. 265-281, 1983
[9] N. Nisan and A. Ronen: "Computationally feasible VCG Mechanisms," *Proceedings of the 2nd ACM Conference on Electronic Commerce*, 2000
[10] W. Vickrey: "Counterspeculation, Auctions, and Competitive Sealed Tenders," *Journal of Finance* 16, pp. 8-37, 1961.

Many practical situations involve a social choice problem in which a group of agents has to choose an outcome that best fits their combined preferences. For example, a group going out to have dinner together has to choose a restaurant that fits everyone's preferences. Tenants of a building have to decide on features of a planned renovation. Spectrum has to be divided up among different mobile telephone providers.

A mechanism for solving a social choice problem is a method algorithm that takes as inputs declarations of the agents' utilities for each outcome, and outputs as a solution the optimal choice plus possibly other information.

Social choice problems become difficult to solve when agents have conflicting preferences, as each agent will exaggerate its preferences to obtain a better outcome for itself.

It is possible to counteract this tendency using tax schemes where agents have to pay for the preferences they claim. An example of such tax schemes are auctions: the social choice is to decide who receives the good being auctioned, and the winner has to make a payment that depends on how strongly he claims to value the good.

In an incentive-compatible (IC) mechanism, the incentives of each agent are aligned with those of the group: the behavior that optimizes the utility of an individual agent also optimizes the utility of the group. When utility optimization is left to the social choice mechanism, this often corresponds to each agent being best off declaring its preferences truthfully; this is called truthful or strategyproof Such a mechanism makes life easy for the agents since they do not have to speculate to obtain the best outcome. It also avoids choosing a suboptimal outcome because of such speculation.

A well-known mechanism for achieving IC is the Vickrey-Clarke-Groves (VCG) tax ([2]) mechanism. It assumes that the mechanism chooses an outcome that maximizes the sum of agents' utilities (called the Pareto-efficient outcome, PE), and makes each agent pay a tax that is calculated so that the agent cannot gain from misreporting its utility. Furthermore, the VCG tax is individually rational (IR) in that the tax paid by an agent never exceeds the utility gain the agent gets from participating in the optimization as opposed to letting the other agents pick the outcome.

Any tax mechanism produces a surplus of taxes that cannot be redistributed to the agents without loosing the incentive-compatible property, i.e. the tax mechanisms are not budget-balanced (BB). In game theory, it has been shown that all incentive-compatible mechanisms that apply to general problems and always generate a Pareto-efficient outcome must use a tax of a form similar to the VCG tax ([5, 7]). It has further been shown that such a mechanism cannot be budget-balanced ([5, 8]).

In the special case of auctions, the surplus can be used to pay the sellers of the goods; the resulting VCG scheme is called the Vickrey auction protocol. However, in many cases, there is no use for this surplus. It reduces agents' utilities, and creates incentives for the receiver of the surplus to manipulate the setting to maximize taxes. For example, in spectrum allocation, governments can obtain huge windfall profits by creating scarcity, but in so doing hurt the public in general.

Accordingly, there is a need for systems and methods that allow social choice to take place without creating any surplus or deficit while still making it in each agent's best interest to follow the solution provided.

SUMMARY OF THE INVENTION

One embodiment of the invention is a method for social choice that randomly chooses a subset of the parties, called the excluded coalition, and computes an outcome that considers the parties' utilities either not at all or only as a secondary consideration. In return, the parties whose utilities were considered in the optimization pay a tax to the parties in the excluded coalition. In a particular embodiment of the invention, whatever scheme is chosen to compute the tax payment, the scheme will preserve all properties of incentive-compatibility and individual rationality of the underlying tax scheme. However, in this embodiment the chosen outcome is not Pareto-efficient, as it is not optimal to all parties.

On randomly generated social choice problems, it can be seen that the loss of agent utility due to the lack of Pareto-efficiency is in general much smaller than the loss the agents would incur through the taxes in a VCG mechanism. Thus, in many practical settings, various embodiments of the new mechanism provide significantly better utility to all agents than earlier known methods.

A social choice determination system according to one embodiment of the invention is adapted for determining which of a plurality of different outcomes should be implemented. In particular, in one embodiment of the invention, the system is configured for: (A) identifying a first party of a plurality of parties as at least one party that comprises an excluded group of parties; (B) identifying a candidate group that includes each of the plurality of parties other than the excluded group of parties; (C) receiving, from the first party, a first-party utility value that the first party would associate with at least one of the plurality of different outcomes; (D) receiving, from a second party, a second-party utility value that the second party would associate with at least one of the plurality of different outcomes, the second party being part of the candidate group; and (E) determining which particular one of the plurality of outcomes should be selected based primarily on a set of utility values that comprises the second-party utility value. In one embodiment of the invention, the identifying step at Step (A) is made without substantially considering the first-party utility value, and the determining step at Step (E) is made without substantially considering the first-party utility value.

In a particular embodiment of the invention, the excluded group comprises more than one of the plurality of parties. In addition, in one embodiment of the invention, the plurality of different outcomes comprises a plurality of different outcomes of a determination of which of the plurality of parties should own a particular item. In another embodiment of the invention, the plurality of different outcomes comprises a plurality of different outcomes of a determination of which of the plurality of parties should have a pre-determined set of rights related to a resource. In a further embodiment of the invention, the plurality of different outcomes comprises a plurality of different outcomes of a determination of a common parameter that affects at least one of the parties.

In a particular embodiment of the invention, the system is further configured for indicating that the at least one party within the candidate group must make the side payment to the excluded group. In one embodiment of the invention, the system is configured for calculating a side payment that each party within the candidate group must make to the excluded group.

In a further embodiment of the invention, the system is configured for, at Step (A), identifying the first party in a substantially random manner.

Furthermore, in one embodiment of the invention, the system is configured for receiving, from a third party of the plurality of parties, a third-party utility value that the third party would associate with at least one of the plurality of different outcomes. In this embodiment, the set of utility values may comprise the third-party utility value. In one embodiment of the invention, the system is configured for calculating a side payment that at least one party within the candidate group must make to the excluded group. In a particular embodiment of the invention, this side payment may be determined, at least in part, based on the second party utility value. In another embodiment of the invention, the side payment comprises an average of a plurality of VCG taxes. In yet another embodiment of the invention, the side payment comprises an average of a plurality of first price taxes.

In one embodiment of the invention, the excluded group of parties consists of the first party. In this embodiment, the system may be configured for determining which single one of the plurality of parties should comprise the excluded group of parties using a substantially random method in which each of the plurality of parties has substantially the same chance of being selected to comprise the excluded group of parties. In addition, the system may be configured for calculating a side payment that at least one of the plurality of parties must make to another of the plurality of parties. This side payment may be calculated based on utility values associated with outcomes chosen when the excluded group consists of a single party.

In a particular embodiment of the invention, the system is further configured for calculating a side payment that the second party must make to the first party. This second party utility value may be, for example, a utility value associated with an outcome under which the first party is an excluded group. In addition, the side payment may be calculated based on the second party utility value.

A system according to yet another embodiment of the invention is configured for determining which of a plurality of different outcomes should be implemented, and each of this plurality of outcomes includes both a first outcome for a first decision to be made and a second outcome for a second decision to be made. In one such embodiment of the invention, the system is configured for: (A) for the first decision, identifying, from a plurality of parties: (1) a first excluded group of parties, and (2) a first candidate group of parties; (B) receiving a first group of candidate-group utility values comprising at least one utility value for at least one particular party within the first candidate group that the particular party within the first candidate group would associate with at least one outcome of the first decision; (C) for the second decision, identifying, from the plurality of parties: (1) a second excluded group of parties, and (2) a second candidate group of parties; (D) receiving a second group of candidate-group utility values comprising at least one utility value for at least one particular party within the second candidate group that the particular party within the second candidate group would associate with at least one outcome of the second decision; (E) receiving a first group of excluded-group utility values comprising at least one utility value for at least one particular party within the first excluded group that the particular party within the first excluded group would associate with the first decision; (F) determining which of the plurality of different outcomes should be selected based primarily on a plurality of groups of utility values comprising the first and second groups of candidate-group utility values. In a particular embodiment of the invention, the identifying step at Step (A) is made without substantially considering the first-party utility value, and the determining step at Step (F) is made without substantially considering the first group of excluded-group utility values.

In one embodiment of the invention, the plurality of different outcomes comprises a plurality of different outcomes of a determination of which of the plurality of parties should own a particular item. In another embodiment of the invention, the plurality of different outcomes comprises a plurality of different outcomes of a determination of which of the plurality of parties should have a pre-determined set of rights related to a resource. In a further embodiment of the invention, the plurality of different outcomes comprises a plurality of different outcomes of a determination of a common parameter that affects at least one of the parties.

In one embodiment of the invention, each of the plurality of outcomes further comprises a third outcome for a third decision to be made and the system is configured for: (G) for the third decision, identifying, from the plurality of parties: (1) a third excluded group of parties, and (2) a third candidate group of parties. In addition, the system may be configured for: (H) receiving a third group of candidate-group utility values comprising at least one utility value for at least one particular party within the third candidate group that the particular party within the third candidate group would associate with at least one outcome of the third decision. In a particular embodiment of the invention, the plurality of groups of candidate-group utility values comprises the third group of candidate-group utility values.

In one embodiment of the invention, the system is configured for receiving a second group of excluded-group utility values comprising at least one utility value for at least one particular party within the second excluded group that the particular party within the second excluded group would associate with the second decision. In this embodiment, the determining step at Step (F) may be made without substantially considering the second group of excluded-group utility values.

In a particular embodiment of the invention, the system is further configured for receiving a third group of excluded-party utility values comprising at least one utility value for at least one particular party within the third excluded group that the particular party within the third excluded group would associate with the third decision. In this embodiment of the invention, the determining step at Step (F) may be made without substantially considering the third group of excluded-group utility values.

In one embodiment of the invention, the system is configured for, after determining which particular one of the plurality of outcomes should be selected, calculating a side payment that at least one of the plurality of parties must make to another of the plurality of parties.

In a particular embodiment of the invention, the system is further configured for, at the Step (A), identifying the first excluded group of parties in a substantially random manner. In one embodiment of the invention, the system is further configured for, at Step (C), identifying the second excluded group of parties in a substantially random manner. In a particular embodiment of the invention, the system is configured for, after determining which particular one of the plurality of outcomes should be selected, calculating a side payment that at least one of the plurality of parties must make to another of the plurality of parties. This side payment may be determined, at least in part, based at least in part on the first group of utility values and/or a second group of utility values. This side payment may be, for example, an average of a plurality of VCG taxes, or an average of a plurality of first price taxes.

In one embodiment of the invention, the first excluded group of parties consists of a single party; and the system is configured for determining which single one of the plurality of parties should comprise the first excluded group of parties using a substantially random method in which each of the plurality of parties has substantially the same chance of being selected to comprise the first excluded group of parties. In another embodiment of the invention, the second excluded group of parties consists of a single party, and the system is configured for determining which single one of the plurality of parties should comprise the first excluded group of parties using a substantially random method in which each of the plurality of parties has substantially the same chance of being selected to comprise the second excluded group of parties.

In a particular embodiment of the invention, the system is further configured for calculating a side payment that at least one of the plurality of parties must make to another of the plurality of parties. In this embodiment of the invention, the side payment may be calculated based on utility values associated with outcomes chosen for each decision when the excluded group consists of exactly one party.

A system according to yet another embodiment of the invention is configured for determining which particular party of a plurality of parties should receive a set of rights. This plurality of parties may consist of a particular number of parties. The system may be configured for: (A) receiving a bid from each of the plurality of parties; (B) with a probability of about $$\frac{\text{the number of particular parties} - 1}{\text{the number of particular parties}}$$

determining that the highest bidder of the plurality of parties should receive the set of rights; and (C) with a probability of about $$1/(\text{the number of particular parties})$$

determining that the second highest bidder of the plurality of parties should receive the set of rights. In one embodiment of the invention, the system is configured so that the system also determines that the highest bidder should pay each of the plurality of parties other than itself and other than the second highest bidder, a sum that is equal to about $$\frac{\text{the amount of the second highest bid offered by the plurality of parties}}{\text{the number of particular parties}}$$

In another embodiment of the invention, the system is configured to also determine that the highest bidder should pay each other of the plurality of parties other than itself and other than the second highest bidder, a sum that is equal to about $$\frac{\text{the amount of the highest bid offered by the plurality of parties}}{\text{the number of particular parties}}$$

A system for attributing a plurality of obligations to a plurality of parties is adapted to execute the steps of: (A) identifying a first party of the plurality of parties as an excluded party; (B) receiving, from a second party of the plurality of parties, a cost value that the second party would incur if the second party were assigned a set of obligations comprising at least one of said obligations; (C) determining, for each particular one of said obligations, which party of said plurality of parties should be assigned that particular obligation. In one embodiment, the determining step at Step (C) is based primarily on a set of cost values that comprises the second-party cost value. Also, in one embodiment, the identifying step at Step (A) is made randomly such that each party is excluded with a probability of about [1/(the number of particular parties)]. In addition, in a particular embodiment, in the determining step at step (C), no obligation is attributed to the excluded party.

BRIEF DESCRIPTION OF THE DRAWINGS

Figure 1:
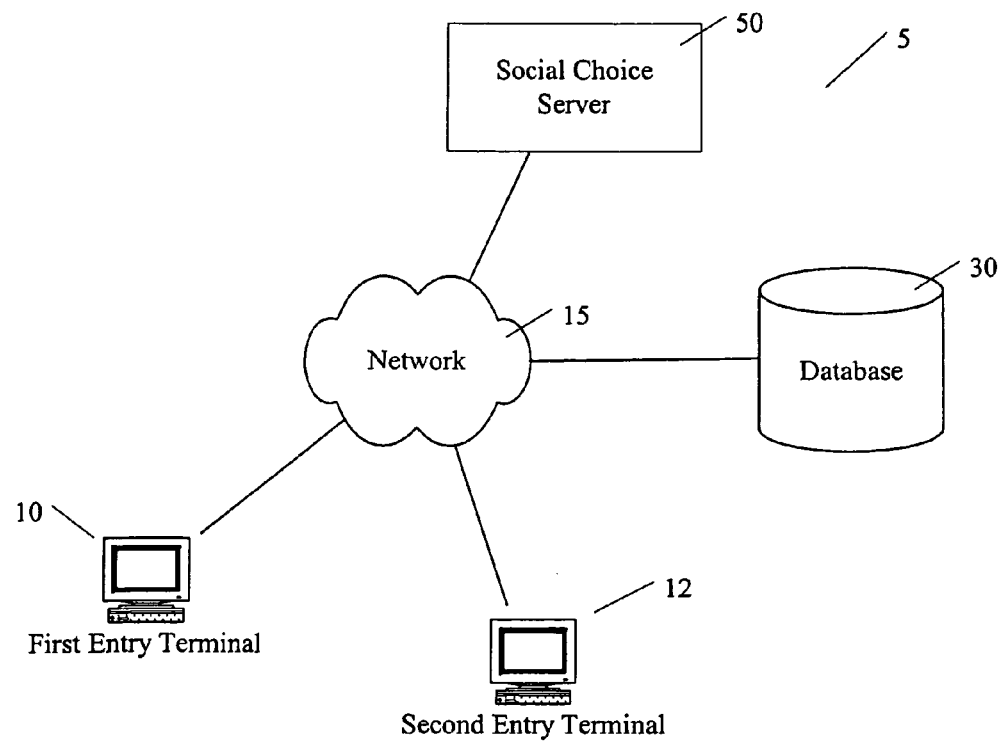

Having thus described the invention in general terms, reference will now be made to the accompanying drawings, which are not necessarily drawn to scale, and wherein:

FIG. 1 is a block diagram of a Social Choice Determination System according to one embodiment of the invention.

Figure 2:
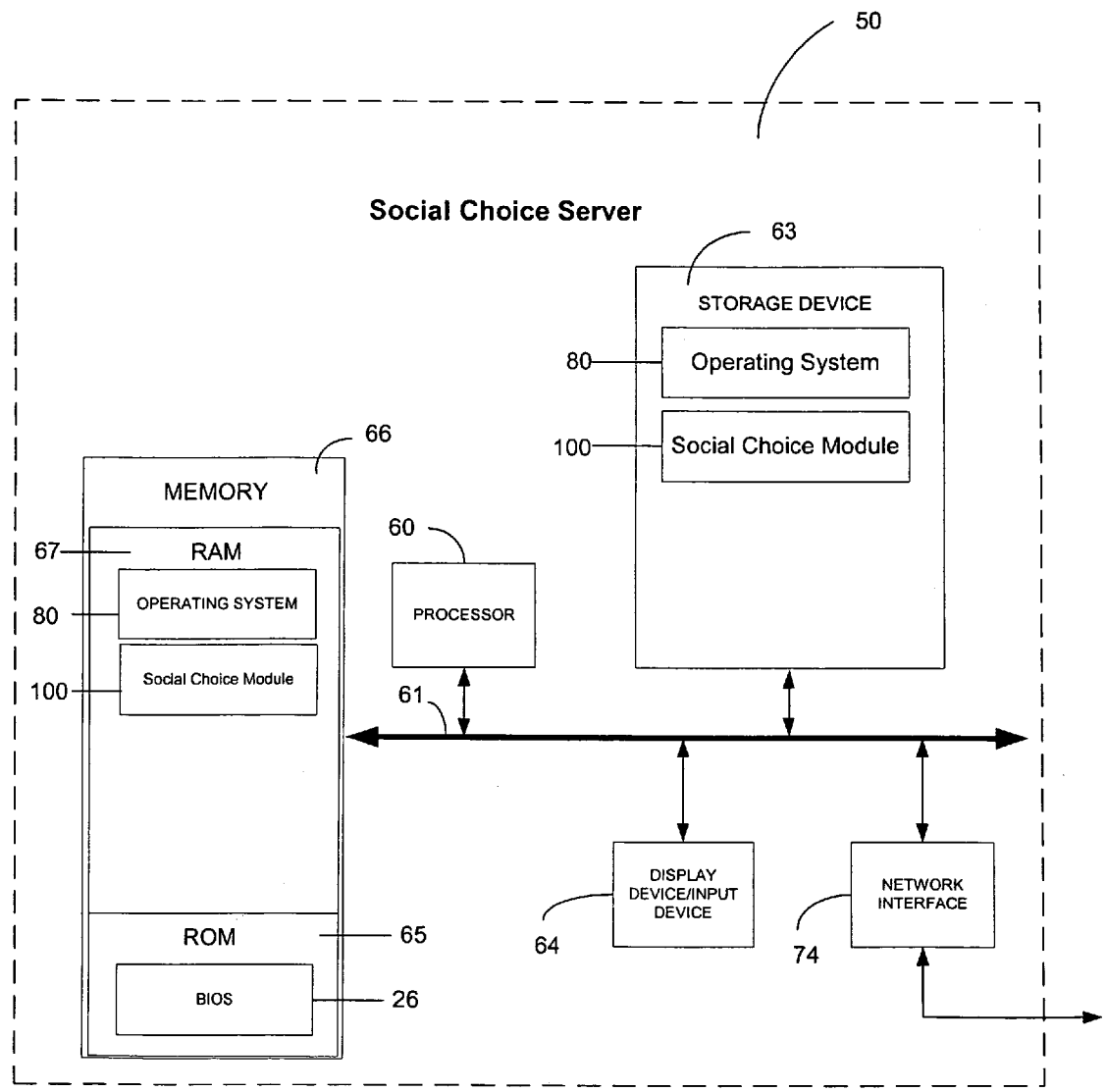

FIG. 2 is a diagram of a Social Choice Server according to an embodiment of the present invention.

Figure 3:
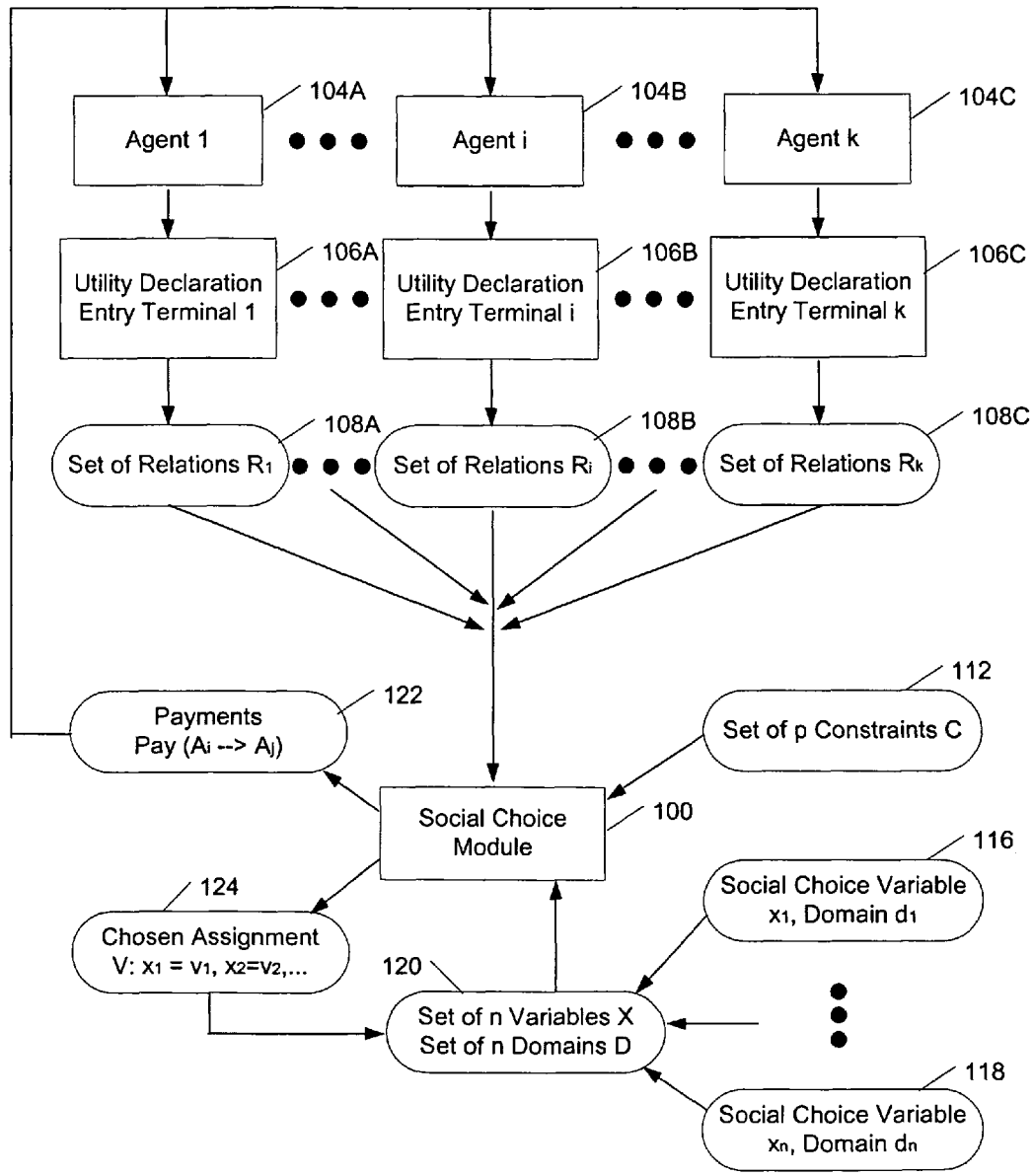

FIG. 3 is a data flow diagram for a Social Choice Determination System according to a particular embodiment of the invention.

Figure 4:
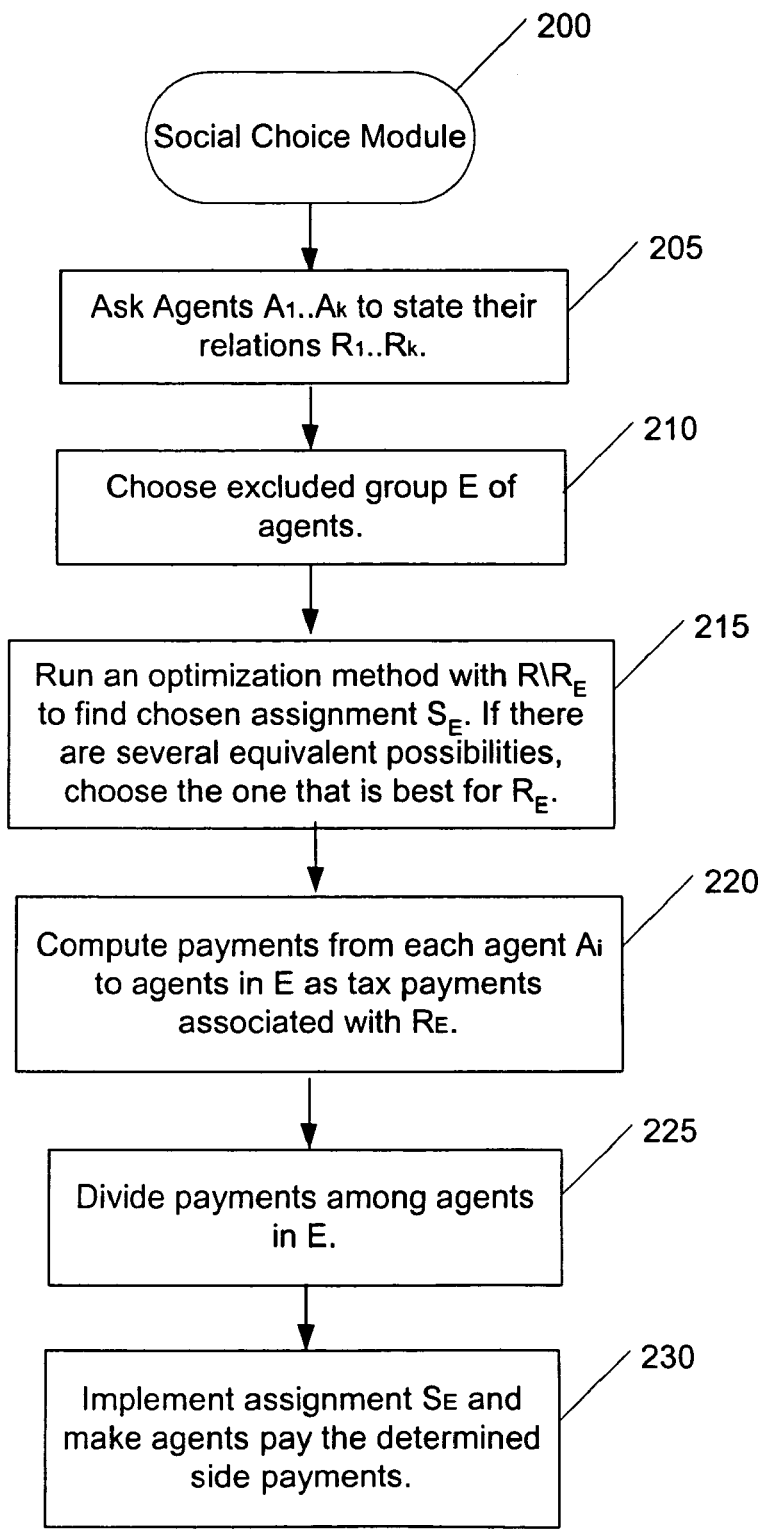

FIG. 4 is a flowchart that illustrates various steps executed by a social choice module according to a particular embodiment of the invention.

Figure 5A:
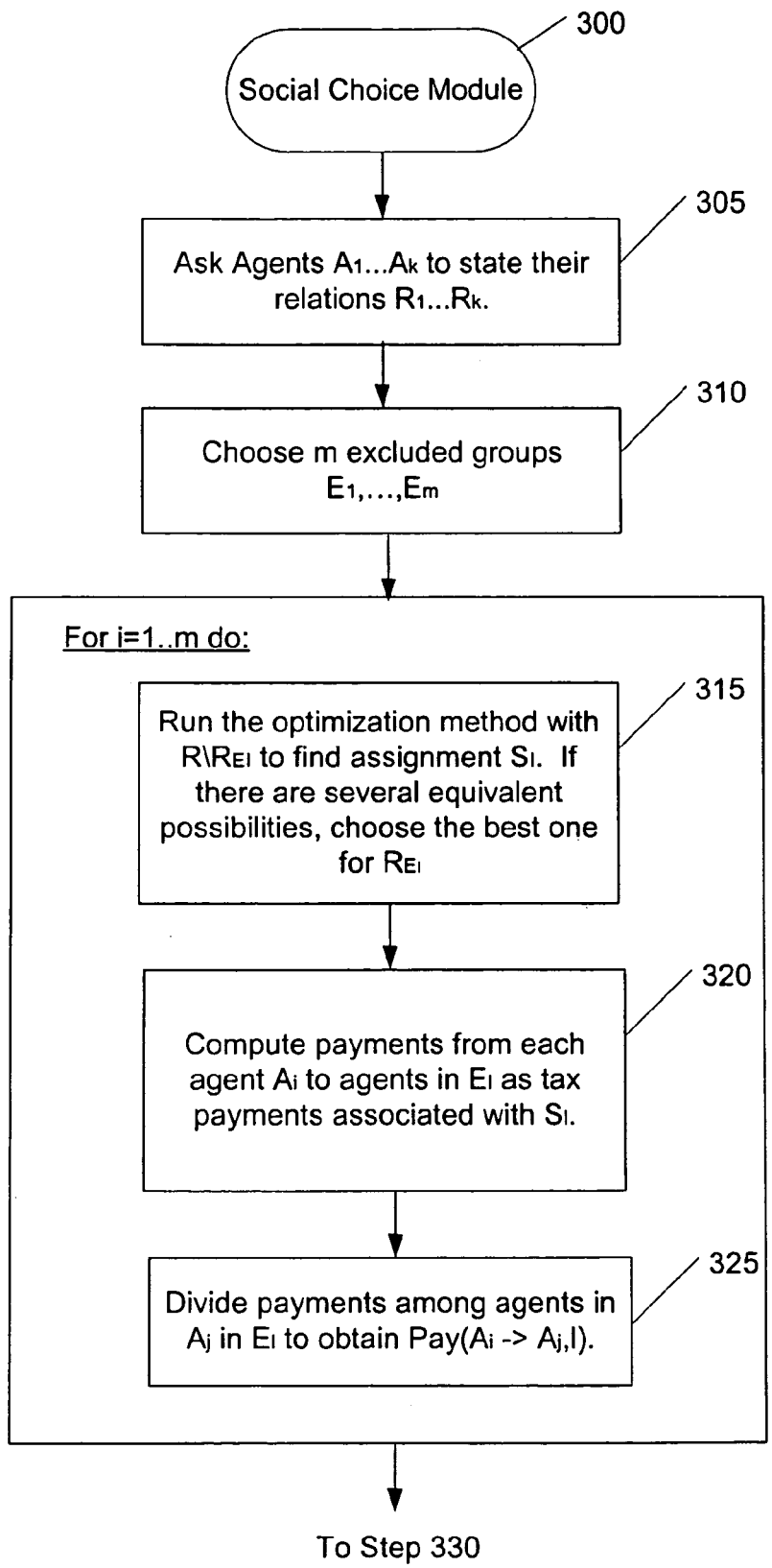
Figure 5B:
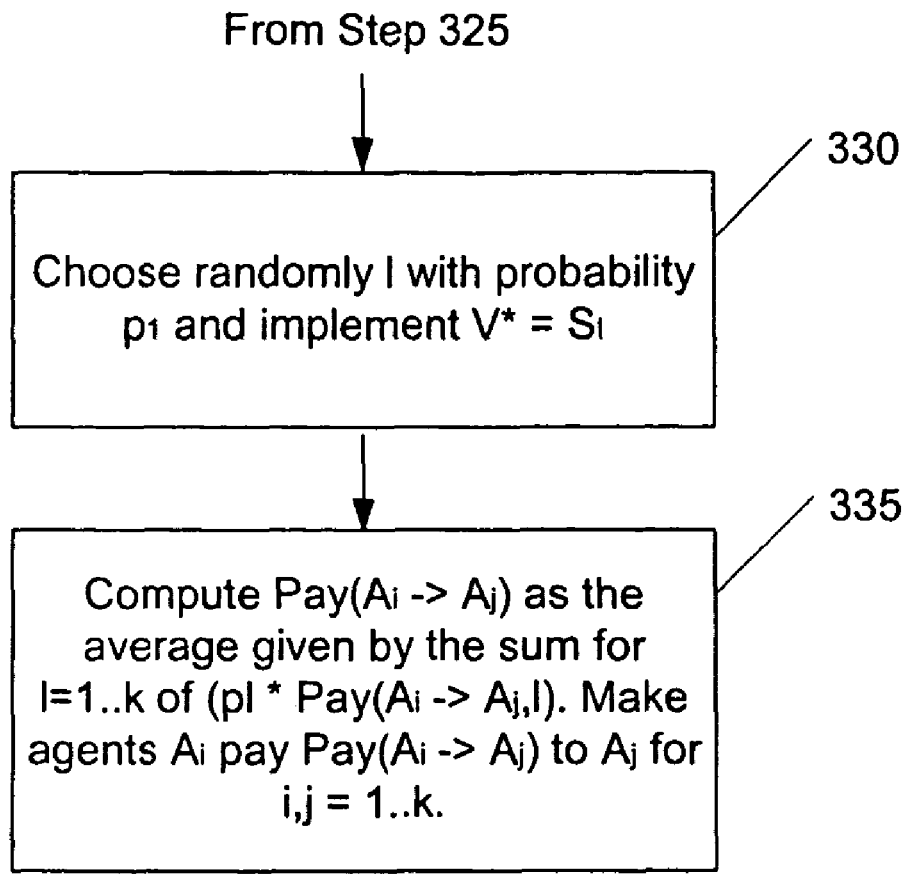

FIGS. 5A and 5B depict a flowchart that illustrates various steps executed by a social choice module according to another embodiment of the invention.

Figure 6A:
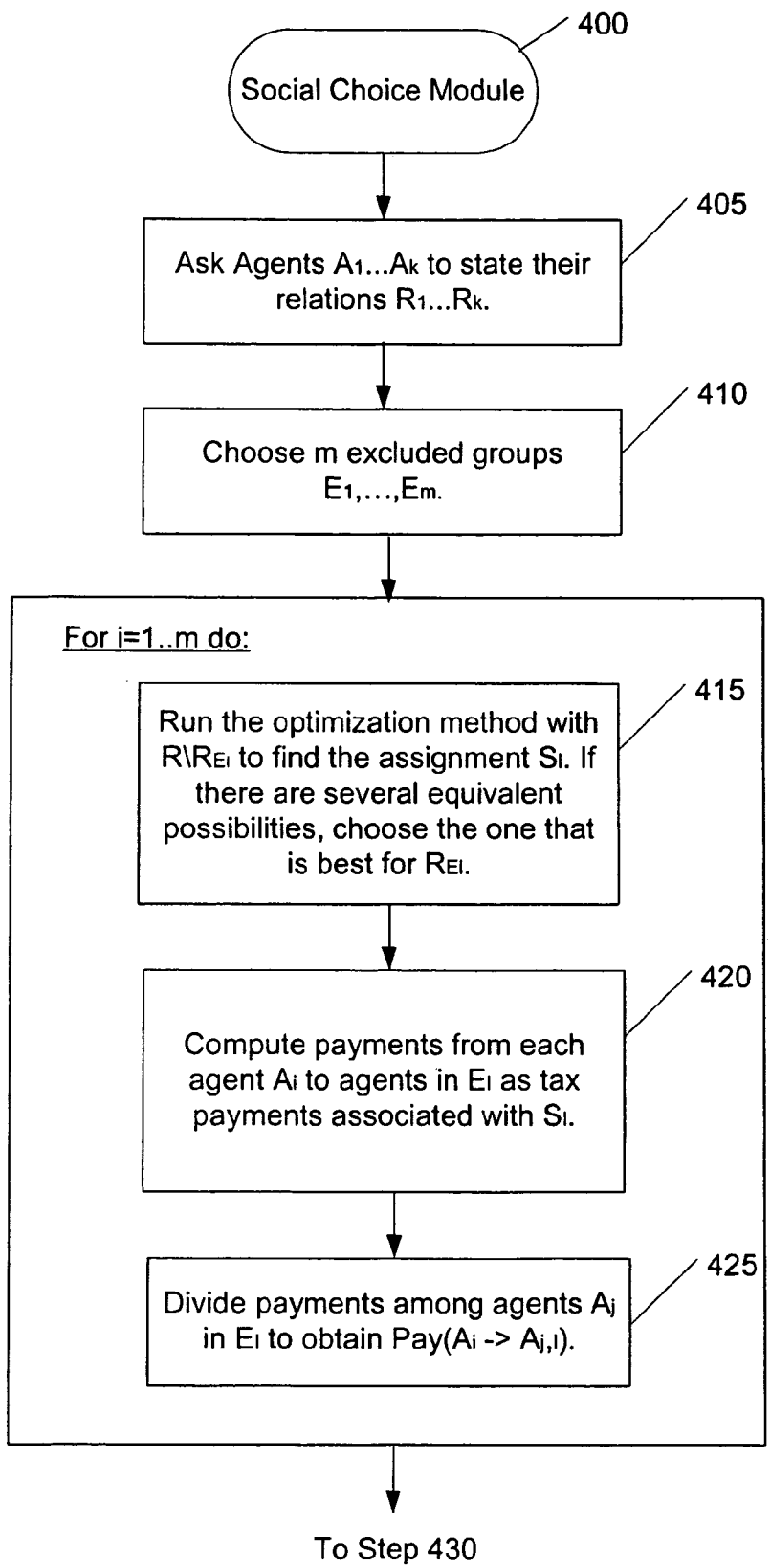
Figure 6B:
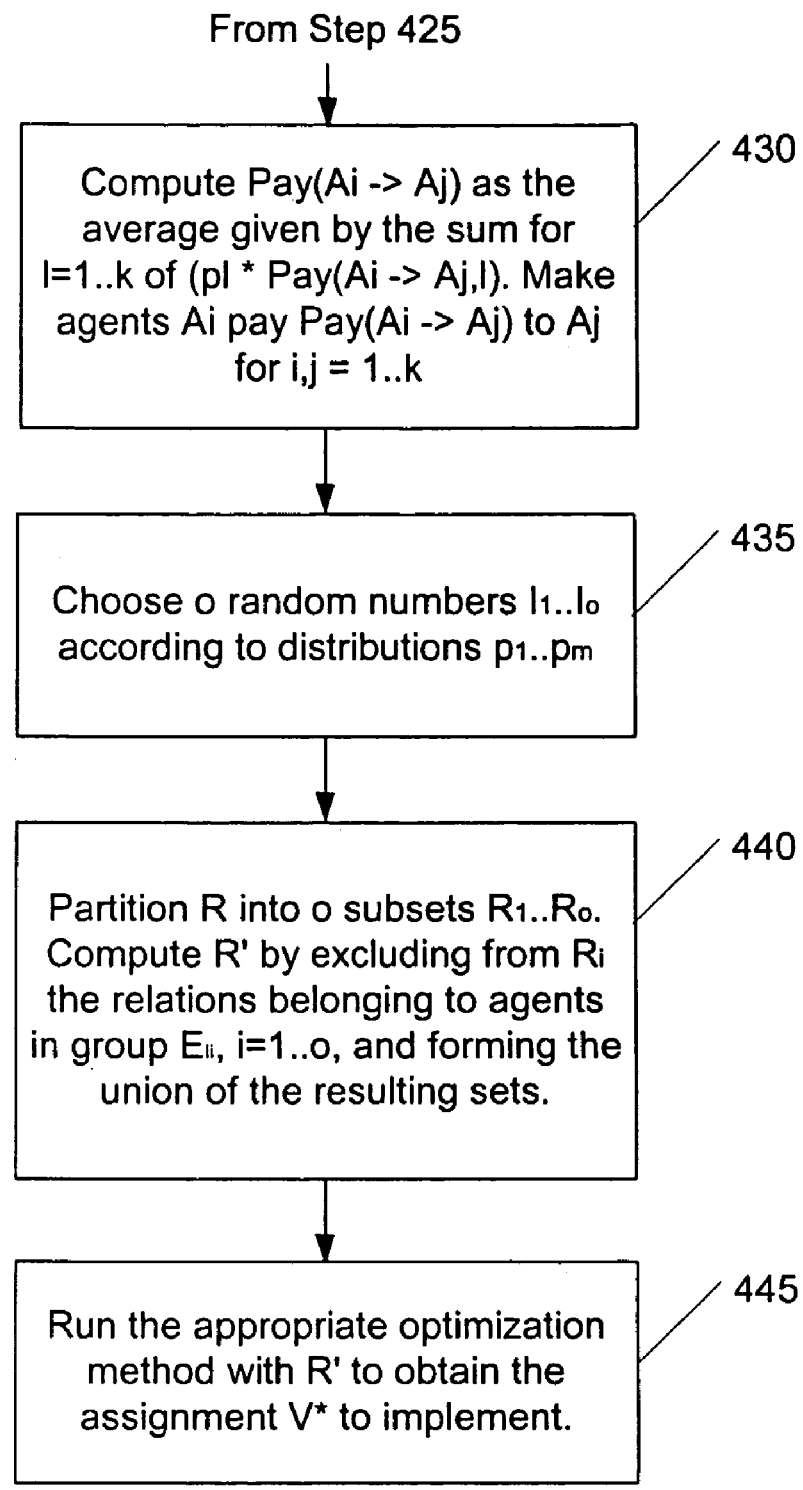

FIGS. 6A and 6B depict a flowchart that illustrates various steps executed by a social choice module according to yet another embodiment of the invention.

Figure 7A:
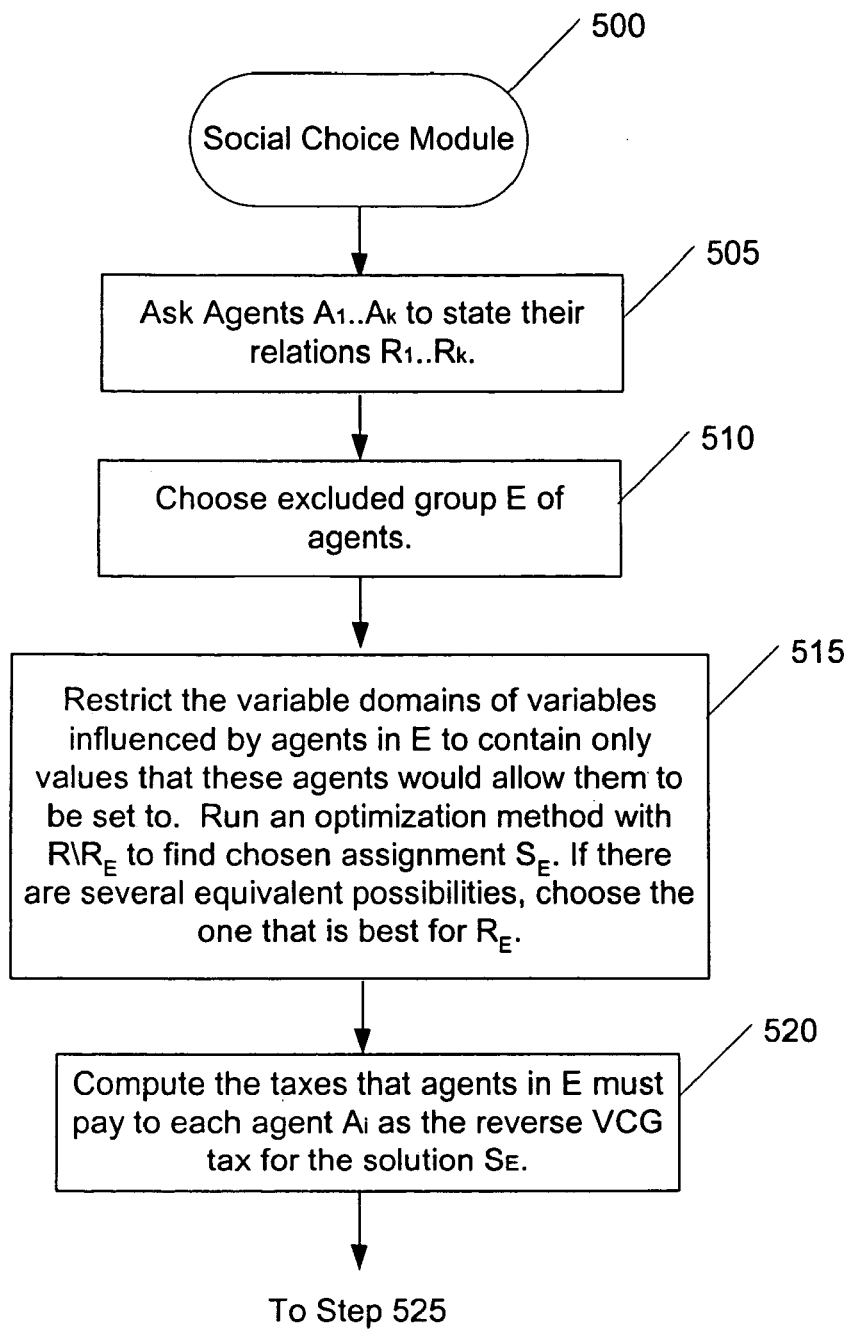
Figure 7B:
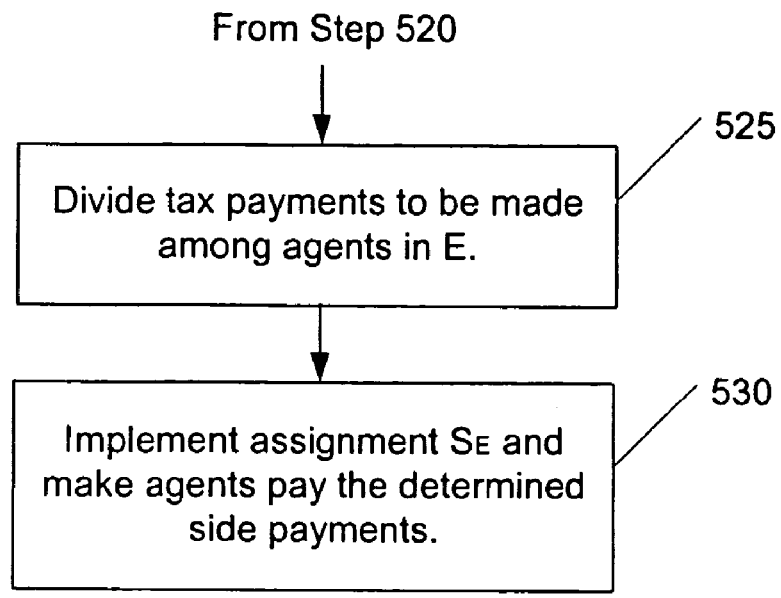

FIGS. 7A and 7B depict a flowchart that illustrates various steps executed by a social choice module according to a further embodiment of the invention.

Figure 8:
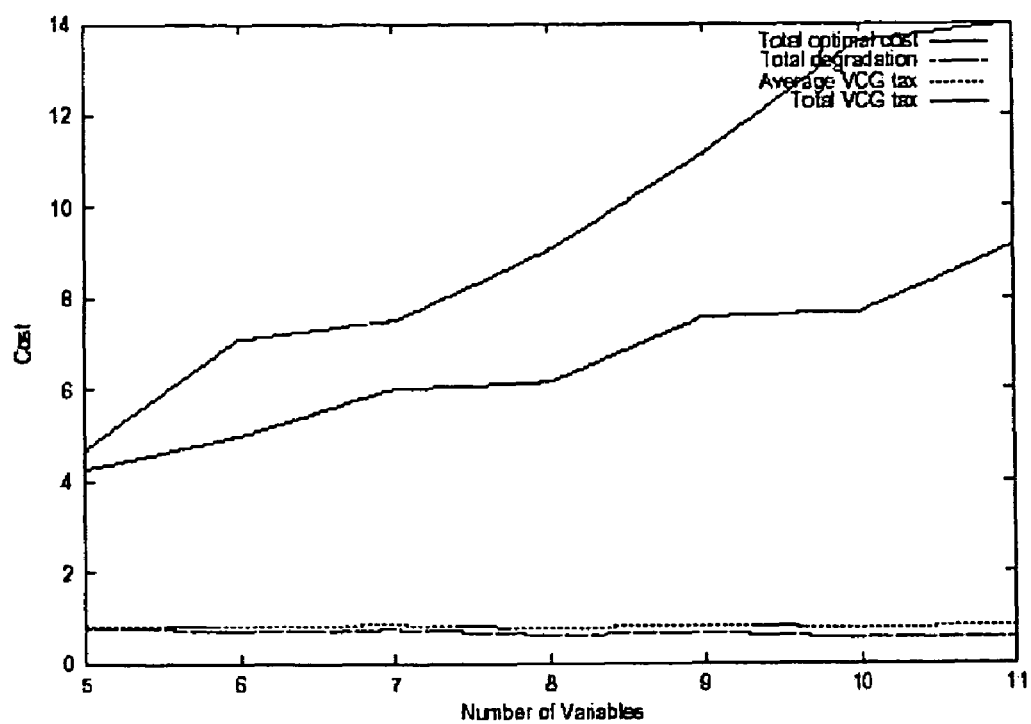

FIG. 8 is a graph of the various costs for randomly generated constraint optimization problems where each variable belongs to a different agent. In particular, this graph shows the total cost to all agents of the optimal solution, the total VCG tax that would be paid by all agents, the degradation of the total cost when a solution computed by a Mechanism of the invention is used, and the average VCG tax paid by one agent.

DETAILED DESCRIPTION OF THE INVENTION

The present invention now will be described more fully with reference to the accompanying drawings, in which some, but not all embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.

As will be appreciated by one skilled in the art, the present invention may be embodied as a method, a data processing system, or a computer program product. Accordingly, the present invention may take the form of an entirely hardware embodiment, an entirely software embodiment, or an embodiment combining software and hardware aspects. Furthermore, the present invention may take the form of a computer program product on a computer-readable storage medium having computer-readable program instructions (e.g., computer software) embodied in the storage medium. More particularly, the present invention may take the form of web-implemented computer software. Any suitable computer-readable storage medium may be utilized including hard disks, CD-ROMs, optical storage devices, or magnetic storage devices.

The present invention is described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

1 SYSTEM ARCHITECTURE

A system 5 according to one embodiment of the invention is shown in FIG. 1. As may be understood from this figure, in this embodiment, the system includes one or more entry terminals 10, 12 that are connected, via a network 15 (e.g., a LAN or the Internet), to communicate with a Social Choice Server 50. As will be understood by one skilled in the relevant field, the entry terminals 10, 12 may be, for example, terminals with processing capacity (e.g., personal computers) or terminals without processing capacity (e.g., mainframe terminals). In one embodiment of the invention, the Social Choice Server 50 is configured for retrieving data from, and storing data to, a database 30 that may be stored on (or, alternatively, stored remotely from) the Social Choice Server 50.

FIG. 2 shows a schematic diagram of a Social Choice Server 50 according to one embodiment of the invention. The Social Choice Server 50 includes a processor 60 that communicates with other elements within the Social Choice Server 50 via a system interface or bus 61. Also included in the Social Choice Server 50 is a display device/input device 64 for receiving and displaying data. This display device/input device 64 may be, for example, a keyboard or pointing device that is used in combination with a monitor. The Social Choice Server 50 further includes memory 66, which preferably includes both read only memory (ROM) 65 and random access memory (RAM) 67. The server's ROM 65 is used to store a basic input/output system 26 (BIOS), containing the basic routines that help to transfer information between elements within the Social Choice Server 50.

In addition, the Social Choice Server 50 includes at least one storage device 63, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide nonvolatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 67. Such program modules include an operating system 80, a social choice module 100. The social choice module 100 controls certain aspects of the operation of the Social Choice Server 50, as is described in more detail below, with the assistance of the processor 60 and an operating system 80.

Also located within the Social Choice Server 50 is a network interface 74, for interfacing and communicating with other elements of a computer network. It will be appreciated by one of ordinary skill in the art that one or more of the Social Choice Server 50 components may be located geographically remotely from other Social Choice Server 50 components. Furthermore, one or more of the components may be combined, and additional components performing functions described herein may be included in the Social Choice Server 50.

2 MODELLING SOCIAL CHOICE PROBLEMS

A social choice problem can be simply formulated as a choice among a set of possible outcomes. However, it is often useful to further structure this outcome space. In particular, we assume that the outcome space is the set of solutions to a constraint satisfaction problem (CSP), which is defined by a set of variables that can be assigned values in associated domains. A solution to a particular constraint satisfaction problem is a combination of value assignments to all variables such that all of the constraints within a set of constraints associated with the CSP are simultaneously satisfied.

Based on the CSP formulation, we model social choice problems as multi-agent constraint optimization problems. These are constraint satisfaction problems in which each agent agent within a set of agents has declared relations that specify the utilities they attach to different value combinations. Formally, they are defined as follows:

Definition 1 A discrete multi-agent constraint optimization problem (MCOP) is a tuple <A, X, D, R> where:
- $A=\{A_1, \ldots, A_k\}$ is a set of agents.
- $X=\{x_1, \ldots, x_n\}$ is a set of variables.
- $D=\{d_1, \ldots, d_n\}$ is a set of domains of the variables, each given as a finite set of possible values.
- $C=\{c_1, \ldots, c_p\}$ is a set of constraints, where a constraint $c_j$ is a function $d_{i1} \times \ldots \times d_{il} \rightarrow \{0, 1\}$ that returns 1 if the value combination is allowed and 0 if it is not.
- $R=\{r_1, \ldots, r_o\}$ is a set of relations, where a relation $r_i$ is a function $d_{i1} \times \ldots \times d_{il} \rightarrow \Re$ giving the utility of choosing each combination of values.
- $R_i$ is the subset of R that gives the relations associated with agent $A_i$.

A solution to an MCOP is a consistent assignment to the underlying CSP that maximzes the sum of the agents' utilities. Formally, we define:

Definition 2 An assigment V is a combination of values $x_1=v_1 \in d_1, \ldots, x_n=v_n \in d_n$.

We write $r_i(V)$ and $c_i(V)$ for the result of applying $r_i$ or $c_i$, respectively, to the relevant variables with the assignments in V.

An assignment V is consistent if all constraints are satisfied, i.e. $(\forall c_i \in C) c_i(V)=1$.

An MCOP is solvable if there is at least one consistent assignment.

We write $V^*_R$ for the consistent assignment such that the sum of the utilities obtained by the relations corresponding to R is maximal; if there are several such assignments it is the one that is lexicographically smallest. We use $v^*_R(x_i)$ for the value of $x_i$ in that assignment.

The solution to a MCOP is the assignment $V^*_R$ where R is the set of all relations of the MCOP.

We only consider solvable MCOP. When an MCOP is unsolvable, the solution choice problem itself has no solution.

FIG. 3 illustrates the information flow in an embodiment of a social choice system using this model. In this embodiment, the social choice problem is communicated to the social choice module 100 in this embodiment by:
1. the sets of variables and domains 120, made up of social choice variables $x_1$ with domain $d_1$, 116 up to $x_n$ with domain $d_n$, 118.
2. the set of constraints 112.
3. the sets of relations R1 108A through Rk 108C.

These are the inputs to the social choice module 100.

The parties are modelled by k agents Agent 1 (104A) through Agent k (104C). Each agent Agent 1 through Agent k uses a utility declaration entry terminal (106A through 106C) to communicate its set of relations $R_1$ through $R_k$ (108A through 108C). In one embodiment, the utility declaration entry terminals are physically identical to the entry terminals 10,12 in FIG. 1, and some may be the identical device.

The social choice module 100 computes a chosen assignment 124 that is implemented on the set of variables 120 and possibly a set of payments 122 that are required by the agents 104A-104C.

As an example, consider the following social choice problem. A building has 4 tenants, represented by agents $A_1$ through $A_4$. The tenants have to agree on three architectural features $X=\{x_1, x_2, x_3\}$ of a planned renovation. For the three features, we have options $x_1 \in d_1=\{A, B, C\}$, $x_2 \in d_2=\{A, C\}$ and $x_3 \in d_3=\{B, C\}$. For structural reasons, the combination of $x_2=A$ and $x_3=C$ is not allowed, but all other combinations are feasible. This restriction is modelled by a constraint.

Each agent attaches different utilities to a feature or feature combination. Specifically:

for agent $A_1$ and any of the three features, choosing A has a utility of −1, B a utility of 0 and C a utility of +1. This defines a set $R_1$ of three relations that is communicated to the social choice module 100.

for agent $A_2$, the utility is determined by the combination of features $x_1$ and $x_2$ according to the following table:

| $(x_1, x_2)$ | utility |
| --- | --- |
| (B, C) | 2 |
| (C, C) | 2 |
| (A, C) | 1 |
| (B, A) | −1 |
| (C, A) | −1 |
| (A, A) | −3 |

This defines a set $R_2$ consisting of a single relation as shown above that is communicated to the social choice module 100.

for agent $A_3$, the utility is determined by the combination of features $x_1$ and $x_3$ according to the following table:

| $(x_1, x_3)$ | utility |
|---|---|
| (A, C) | 2 |
| (C, C) | 2 |
| (A, B) | 1 |
| (C, B) | −1 |
| (B, C) | −1 |
| (B, B) | −3 |

This defines a set $R_3$ consisting of a single relation as shown above that is communicated to the social choice module 100.

Finally, agent $A_4$ attaches the following utilities to combinations of assignments:

| $(x_1, x_2, x_3)$ | utility | $(x_1, x_2, x_3)$ | utility |
|---|---|---|---|
| (A, A, B) | 3 | (C, A, B) | 1 |
| (B, A, B) | 3 | (A, C, C) | −1 |
| (A, A, C) | 1 | (B, C, C) | −1 |
| (A, C, B) | 1 | (C, A, C) | −1 |
| (B, A, C) | 1 | (C, C, B) | −1 |
| (B, C, B) | 1 | (C, C, C) | −3 |

This defines a set $R_4$ consisting of a single relation as shown above that is communicated to the social choice module 100.

The optimal solution to this problem is the combination $x_1=C$, $x_2=C$, $x_3=C$, which provides a total utility of 4.

However, this solution can only be found if agents report their true utilities. In this example, agent $A_4$ could exaggerate its utility for combination $x_1=B$, $x_2=A$, $x_3=B$ to 10. This would give it an overall supposed utility of 5, and make it the one chosen by the mechanism. Agent $A_4$ has improved its own utility from −3 to +3, but the true overall utility has decreased from +4 to −2. Other agents may follow similar reasoning and perturb the result further.

3 ACHIEVING INCENTIVE-COMPATIBILITY

The incentives of each agent can be aligned with those of the group by making each agent pay a tax reflecting the cost that their preferences are causing to others. A well-known mechanism is the Vickrey-Clarke-Groves (VCG) tax mechanism ([10, 2, 6]). Its application for multi-agent decision making has already been proposed in [4].

In the VCG mechanism, each agent pays exactly the loss in utility it causes to the other agents. This loss is determined as the sum of the other agents' utilities in the outcome that is optimal when the agent is not present minus the same sum in the outcome that is optimal when it is present. More formally, let agent $R_i$ be the set of relations $R_i$ imposed by $A_i$, then the tax, called the Clarke tax, is:

$$VCGtax(A_i) = \sum_{r_l \in R \setminus R_i} r_l(V^*_{R \setminus R_i}) - r_l(V^*_R)$$

The VCG tax has the effect of making the objective of each individual agent that of optimizing the sum of all agent's utilities. The utility $U_t(A_i)$ that agent $A_i$ achieves from the result of a social choice using a VCG tax is equal to:

$$U_t(A_i) = \left[\sum_{r_l \in R_i} r_l(V^*_R)\right] - VCGtax(A_i)$$

$$= \sum_{r_l \in R_i} r_l(V^*_R) + \sum_{r_l \in R \setminus R_i} r_l(V^*_R) - r_l(V^*_{R \setminus R_i})$$

$$= \sum_{r_l \in R} r_l(V^*_R) - \sum_{r_l \in R \setminus R_i} r_l(V^*_{R \setminus R_i})$$

$$= \sum_{r_l \in R} r_l(V^*_R) - f_{-i}$$

where $f_{-i}$ is a term that $A_i$ has no influence on. Thus, each agent $A_i$ maximizes its own utility by acting to maximize the utility of the group. If the optimization is left to the social choice mechanism, this makes it a dominant strategy equilibrium for each agent to declare its utilities truthfully.

In our example, we consider the following solutions:

| Solution | $u(A_1)$ | $u(A_2)$ | $u(A_3)$ | $u(A_4)$ | total |
|---|---|---|---|---|---|
| $V^*_R = (C, C, C)$ | 3 | 2 | 2 | −3 | 4 |
| $V^*_{R \setminus R_1} = (A, C, B)$ | 0 | 1 | 1 | 1 | 3 |
| $V^*_{R \setminus R_2} = (C, C, C)$ | 3 | 2 | 2 | −3 | 4 |
| $V^*_{R \setminus R_3} = (B, C, B)$ | 1 | 2 | −3 | 1 | 1 |
| $V^*_{R \setminus R_4} = (C, C, C)$ | 3 | 2 | 2 | −3 | 4 |

Thus, the VCG tax payments of the agents would be:

| Agent | VCG tax |
|---|---|
| $A_1$ | 3 − 1 = 2 |
| $A_2$ | 2 − 2 = 0 |
| $A_3$ | 4 − 2 = 2 |
| $A_4$ | 7 − 7 = 0 |

The example shows that the truth-inducing property of the tax can come at a high cost: in this example the total tax paid, 4 units, completely erases the utility of 4 that the agents jointly get out of their renovation.

3.1 Using Suboptimal Solutions

One problem with the VCG scheme is that it requires finding the true optimal solutions to the underlying optimization problem. Optimization problems are often NP-hard and it may only be possible to compute an approximate solution that is close to the optimal one with high probability. Nisan and Ronen ([9]) point out that using a suboptimal solution makes the VCG scheme loose its incentive-compatibility property.

When an imperfect optimization method is used, it can happen that an agent $A_i$ could make the optimization method reach a better result for all agents by misstating its true utilities. However, if it does so it does not gain any unfair advantage at the expense of other agents. Moreover, if the common mechanism uses a state of the art optimization method, it is unlikely that an individual agent could find a better solution.

Consequently, we consider that all mechanisms presented herein may also be used with an approximate optimization method where V* has an overall utility close to the optimum with high probability. However, in order to guarantee individual rationality, in such a case we need to ensure that the solution found when optimizing $V^*_{R \setminus R_i}$ is not better for all agents than $V^*_R$. This can be done by choosing $V^*_R$ to be the best among $V^*_R$ and the $V^*_{R\setminus R_i}$ for all agents $A_i$ computed by the optimization mechanism.

3.2 Collusion

VCG schemes are vulnerable to collusion: coalitions of agents can act together to achieve unfair advantages over the others. For example, suppose that agent $A_4$, who fares particularly badly in the optimal solution, bribes agent $A_3$ to help $A_4$ impose solution $x_1=A$, $x_2=A$, $x_3=B$. The result lowers $A_3$'S utility by 1 but increases $A_4$'S utility by 6, so $A_4$ can pay $A_3$ 3 units for its trouble and both will benefit from the manipulation. $A_3$ and $A_4$ can impose this solution by each adding a ternary relation between all three variables that would give utility 100 to this value and 0 to all other combinations. Since the solution would remain the same if either $A_3$ or $A_4$ was removed, no agent would pay any taxes, so the manipulation comes for free.

Incentive-compatible mechanisms that optimize the sums of utilities must necessarily take the form of a VCG mechanism [5, 7]. Specifically, the taxes to be paid must be of the form:

$$\text{tax}(A_i) = \sum_{A_j \neq A_i} U_{A_j}(V^*) - f_{-i}$$

where $f_{-i}$ is a function that does not depend on the declarations of $A_i$. This necessarily entails the possibility of collusion. Suppose agent $A_i$ colludes with another agent $A_l$ to influence the result $V^*$. Then by its nature the collusion cannot be detected in $V^*$, and it cannot be detected in $f_{-i}$ either since this function cannot depend on the declarations of one of the colluders, $A_l$.

In auctions, collusion can be avoided by using mechanisms that make bidders pay their bid rather than the second highest bid. Similarly, we can define a tax mechanism for social choice, which we call the first-price tax, where every agent pays as tax the utility gain it gets in the chosen solution, i.e.:

$$F\text{tax}(A_i) = \sum_{r_l \in R_i} r_l(V^*_R)$$

Obviously, the first-price tax is not incentive-compatible, as agents have an interest to claim a lower utility for the optimal solution and a higher utility for the case where they are excluded. However, it does address the problem of overclaiming utilities, as we can show:

Proposition 1 In a mechanism that imposes a first-price tax, it is never rational for an agent to overclaim its true utility gain for a solution.

Proof. If it did, the agent would be forced to pay a higher tax than the utility of the solution if that solution were chosen, but not gain anything if that solution was not chosen.

It is also safe against collusion, as we can also show:
Proposition 2 In a mechanism that imposes a first-price tax, no group of agents can gain utility by colluding.

Proof. Suppose that agents $A_1, \ldots, A_k$ make false utility declarations and change the apparent utility of solution V by $\Delta(V)$; Then they will change the sum of their taxes by $\Delta(V)$ as well. But any agent by itself would pay the same tax if the agent had made the false utility declarations all by itself.

Thus, the first-price tax may be useful in avoiding collusion. A particularly interesting way of eliciting utilities for a first-price tax is an ascending price mechanism. In such a mechanism, utility declarations are provided incrementally in an iterative process including the following sequence of steps:

1. initially, all relations rate all outcomes at a uility of zero.
2. the social choice mechanism proposes an assignment.
3. agents may revise their relations by declaring higher utility values for assignments that are not satisfied by the currently proposed assignment.
4. if there are any modifications, the mechanism modifies the assignment, and repeats the process from step 2.
5. otherwise, the mechanism terminates the process with the last proposed assignment as the chosen solution. All agents pay a first-price tax corresponding to their last stated relations.

It can be shown that in many (but not all) cases, the ascending price mechanism will produce the same chosen assignment and taxes as a VCG mechanism. This is because agents do not change their utility values when the proposed assignment is already their most preferred one; thus they will usually end up with a lower declaration than their true utility values. However, the ascending price mechanism can also be shown to be invulnerable to collusion. An ascending price mechanism can thus be useful to elicit agent preferences when a first-price tax mechanism is used.

4 BUDGET BALANCED MECHANISMS FOR SOCIAL CHOICE

The main difficulty with applying tax schemes to social choice is that they generate a surplus of taxes that reduces overall agent utility and creates unwanted incentives for whatever party gets this surplus. We now show a simple scheme that, in various embodiments of the invention, is always strictly budget balanced, but produces sub-optimal solutions. We assume that the agents are solving an MCOP whose variables, domains and constraints are fixed and known. Furthermore, we are going to assume that the MCOP is solvable, i.e. it has at least one consistent assignment.

The basic idea is to randomly select an agent or a group of agents whose relations will receive a lower priority in the optimization. In return, in one embodiment, this agent or group of agents will be paid the tax collected from the remaining agents. In various embodiments, the scheme is by definition budget balanced since all taxes are paid between the agents themselves. Since the agents receiving the tax have no (or substantially no) influence on the declarations and thus the taxes of the remaining agents, the scheme preserves all incentive-compatibility properties of the tax scheme itself. However, it chooses solutions that are not optimal for all agents.

We now present several budget balanced social choice mechanisms for the social choice module based on this idea. We assume that the tax scheme is that of a VCG tax. However, the mechanisms can be applied with any tax scheme, including the first-price tax.

The simplest mechanism is the following, illustrated in FIG. 4:
Mechanism 1.

At Step 205, each agent $A_i \in A$, $i=1 \ldots k$ is asked to state its relations.

Next, at Step 210, the system chooses an excluded group E of one or more agents using a method that does not depend on the relations stated by the agents.

Next, at Step 215, the system computes the assignment:

$$S_E = V^*_{R \setminus R_E}$$

where $R_E = \cup_{A_j \in E} R_j$. Optionally, if there are several equally optimal assignments, the system chooses the one with the best utility according to the relations in $R_E$. The same mechanism for social choice can be applied recursively to the subproblem of making this choice in a way that is incentive-compatible for agents in E.

Next, at Step 220, the system makes each agent $A_i$ pay to agents in E the VCGtax for the solution $S_E$:

$$pay(A_i \to E) = VCGtax_E(A_i)$$
$$= \sum_{r_m \in R \setminus (R_i \cup R_E)} r_m(V^*_{R \setminus (R_i \cup R_E)}) - r_m(V^*_{R \setminus R_E})$$

The system then proceeds to Step 225 where it distributes the tax among the agents in E according to some predetermined scheme that does not depend on the relations they declared.

Finally, at Step 230, the system implements the chosen assignment $S_E$ and makes agents pay the payments computed in Steps 220 and 225.

In this embodiment, the excluded group can be chosen by any mechanism that does not depend on the utility declarations of the agents. In the interest of fairness, it will often be useful to make this choice randomly. The excluded group can include one or more agents. In many cases, it will be best to choose only a single agent as the excluded group and let the optimization take into account the relations of a maximum number of agents. However, we will see later that larger excluded groups of agents may be useful in certain circumstances.

We now show several properties of Mechanism 1.

Proposition 3 Mechanism 1 is incentive-compatible ex-post.

Proof. Consider an agent $A_i$.

When $A_i \in E$, the agent's declarations have no influence on the outcome nor its tax (which is equal to 0), so it cannot gain by misreporting.

When $A_i \notin E$, then the chosen solution is optimal for a social choice problem where $A_i$ is included. Each agent pays the VCG tax corresponding to that problem. This tax is known to be incentive-compatible ex-post.

Proposition 4 Mechanism 1 is Individually Rational Ex-Post.

Proof. Consider an Agent $A_i$.

When $A_i \in E$, the mechanism chooses a solution that does not consider the utilities of $A_i$. Agent $A_i$'s utility is not worse than if it had not participated in the mechanism at all, and $A_i$ pays no tax. Thus, it is individually rational to participate.

When $A_i \notin E$, $A_i$ is included in the optimization, and $A_i$ pays the VCG tax. This scheme is known to be individually rational ex-post.

Proposition 5 Mechanism 1 is Budget Balanced Ex-Post.

Proof. All taxes are paid to agents in the excluded group E, so no tax surplus or deficit remains to be distributed.

For the example problem, assume that the mechanism chooses to randomly leave out each of the 4 agents individually with probability ¼. We then have the following payments:

| Solution | tax($A_1$) | tax($A_2$) | tax($A_3$) | tax($A_4$) |
|---|---|---|---|---|
| $v^*_{R \setminus R_1}$ = (A, C, B) | −5 | 2 | 1 | 2 |
| $v^*_{R \setminus R_2}$ = (C, C, C) | 5 | −7 | 2 | 0 |
| $v^*_{R \setminus R_3}$ = (B, C, B) | 0 | 0 | −2 | 2 |
| $v^*_{R \setminus R_4}$ = (C, C, C) | 0 | 0 | 0 | 0 |
| E[tax] = | 0 | +³¹⁵⁄₄ | ¼ | 1 |

The mechanism is obviously not Pareto-efficient, as it does not always chose the optimal solution as the final result. However, while the VCG tax mechanism chooses the Pareto-efficient solution, the tax payments cause considerable utility loss. As we have seen before, in the optimal solution of this example, the joint utility of the agents is 4 and is completely eaten up by the sum of the VCG taxes which is also 4. In contrast, in Mechanism 1 the expected utility is $$¼ \cdot (3+4+1+4) = 12/4 = 3$$

which is significantly better. In fact, for this example it is better than the VCG mechanism no matter what agent is excluded from the optimization.

The mechanism may have a choice of several solutions $S_E$ that have equal utility for the agents except E, but different utilities for agents in the excluded group E. This can lead to variations in the efficiency of the mechanism. For example, the solution (A, A, B) is also optimal for $v^*_{R \setminus R_2}$, but it has a total utility of −1. If this had been chosen as the solution in the scenario given above, the expected utility in Mechanism 1 would be ⅞ instead of 3 (but still better than in the VCG mechanism). This shows the importance, in one embodiment, of choosing the best solution for agents in the excluded group as well. This optimization could also be done by letting agents in E choose which of several equivalent solutions $S_E$ is to be chosen to minimize their costs.

Other variants of Mechanism 1 can be obtained by using a different underlying tax scheme. For example, the same scheme can use the first-price tax by changing the payments in step 4 to be made according to this tax. This would make the mechanism safe against collusion, but sacrifice some of its incentive-compatibility properties.

5 EXAMPLES AND EXPERIMENTAL RESULTS

5.1 Revenue-Free Auctions

Consider an auction of a single item among three agents $A_1$, $A_2$ and $A_3$. It can be represented by a variable x that represents the final allocation of the good by an integer 1, 2 or 3 indicating which agent gets the good. Let the agents' valuations be expressed by the relations $r_1$, $r_2$ and $r_3$ on x as follows:

| x = | 1 | 2 | 3 |
|---|---|---|---|
| $r_1$ | a | 0 | 0 |
| $r_2$ | 0 | b | 0 |
| $r_3$ | 0 | 0 | c | and assume that a<b<c, i.e. $A_3$ values the good the most. We assume that the mechanism chooses as excluded group a single agent, where each of the three agents is chosen randomly with probability ⅓. We have the following solutions $S_i = v^*_{R \setminus R_i}(x)$:

| Solution | x= |
|---|---|
| $S_1$ | 3 |
| $S_2$ | 3 |
| $S_3$ | 2 | which gives us the following expected taxes and utilities:

| $A_i$ | $E[tax_0]$ | $pr(x = i)$ | $E[u(A_i)]$ |
|---|---|---|---|
| $A_1$ | $\frac{1}{3}(-b)$ | 0 | $b/3$ |
| $A_2$ | 0 | $\frac{1}{3}$ | $b/3$ |
| $A_3$ | $\frac{1}{3}b$ | $\frac{2}{3}$ | $2c/3 - b/3$ |

We can verify that no agent has an incentive to misreport its valuation:
- if agent $A_1$ overreports a valuation a' so that a'>b>a, $A_1$'s true expected utility drops from b/3 to a/3. Underreporting has no effect.
- if agent $A_2$ underreports a valuation b' so that b>a>b', then $A_2$'s true expected utility drops from b/3 to a/3. If $A_2$ overreports b' so that b'>c>b, then $A_2$'s true expected utility drops to 2b/3−c/3.
- if agent $A_3$ underreports a valuation c' so that c>b>c', then $A_3$'s true expected utility drops to c/3. Overreporting has no effect.

In comparison, in a VCG tax scheme, the Vickrey auction, agent $A_3$ always gets the good and pays tax b, and both other agents get nothing. Only agent $A_3$ has an expected utility of c−b. Thus, agents $A_1$ and $A_2$ are always better off, whereas $A_3$ is better off only as long as $c \leq 2b$. This condition is likely to be satisfied in competitive markets where valuations tend to be close to one another.

One difference between certain embodiments of the present invention and systems employing classical auction schemes is that, in certain embodiments of the invention, the good does not produce any revenue for a third party. This may be desirable for public goods such as airport slots, water or pollution rights, and the use of distribution networks.

The example generalizes to k agents $A_1, \ldots, A_k$ where $A_k$ values the good the most and $A_{k-1}$ the second most: $A_k$ would get the item with probability (k−1)/k and expect to pay each of the k−2 agents $A_1, \ldots, A_{k-2}$ a side payment equal to the valuation of $A_{k-1}$ divided by k; $A_{k-1}$ would get the item with probability 1/k and on average pay nothing.

In light of this disclosure, it can be seen without difficulty how Mechanism 1 can be applied to produce revenue-free versions of more complex auctions such as multi-unit or combinatorial auctions.

In the same example, if we apply Mechanism 1 but using the first-price tax, we would obtain the following expected taxes and utilities:

| $A_i$ | $E[tax_0]$ | $pr(x = i)$ | $E[u(A_i)]$ |
|---|---|---|---|
| $A_1$ | $\frac{1}{3}(-c)$ | 0 | $c/3$ |
| $A_2$ | $b/3 - c/3$ | $\frac{1}{3}$ | $c/3$ |
| $A_3$ | $c/3$ | $\frac{2}{3}$ | $c/3$ |

Thus, in this example, if all agents report the truth, the mechanism will make them all have equal expected utility! However, note that it is obviously in the interest of all agents to speculate by underclaiming utilities.

5.2 Examples where the Mechanism is not Beneficial

It is possible to construct cases where in spite of the wasted tax, the VCG mechanism would still achieve better overall efficiency. This would arise when leaving one agent out of the optimization would give only a marginally better result for the remaining agents, but a significantly worse result for the agent that was excluded. Consider the following example: n people have to go from Geneva to London. They can get a group ticket for up to n−1 people on Swiss at a cost of $100 per person, or a group ticket on British Airways for up to n people at a cost of $110 per person. They can also buy individual tickets for a business jet at a cost of $10,000 per person.

The optimal solution for any subset of n−1 agents it to buy a group ticket on Swiss, forcing the remaining agent to buy an individual ticket. In one embodiment of the invention, the mechanism will chose one of these solutions, so the total cost to all agents is (n−1)$100+10,000, and no agent pays any tax. For n=10, this amounts to $10,900.

A VCG mechanism chooses the overall best solution: buy a group ticket on British Airways. The total expense is n$110, but on top of this each agent has to pay a tax of (n−1)$(110−100). Thus, the total expense for all agents is n$110+n(n−1)$10. For n=10, this amounts to $2,000, significantly less than with Mechanism 1. In fact, the VCG scheme will be better as long as n<33. However, this is a rather exceptional case.

5.3 Average Case Performance

On randomly generated problems, we have observed that on average the VCG tax is much larger than the degradation in solution quality incurred by using a suboptimal solution. FIG. 8 shows a comparison on randomly generated problems with 5 to 11 variables. The problems involve as many agents as variables. For each agent, we randomly generate several binary relations (between 2 variables) where each value combination is assigned a valuation between 0 and 1 with a uniform random distribution, and the number of constraints is limited so that the problem is solvable. We apply Mechanism 1 where each agent is excluded individually with equal probability.

FIG. 8 shows the following quantities:
- the solid line shows the total cost of coexistence in the optimal solution. This is the sum, for all agents, of the difference of the agent's utility in the outcome it prefers most and in the outcome that is optimal for all agents together.
- the dashed line (lowest in the figure) shows the average degradation in the total agent utility when one agent's constraints are not taken into account in the optimization.
- the lightly dotted line (second lowest in the figure) shows the average VCG tax that an agent would have to pay in the VCG (Clarke) tax mechanism.
- the densely dotted line (second highest in the figure) shows the total of all VCG taxes that would have to be paid by all agents.

This experiment shows that the VCG tax mechanism makes agents pay an amount of tax that is almost comparable to the utility loss due to their coexistence. While the tax per agent tends to decrease slightly with the number of agents, the total amount of taxes and thus the loss of social welfare continues to increase with problem size. On the other hand, the cost of the degradation incurred by having a single agent excluded of the optimization is much smaller. In fact, it is comparable or even below the average VCG tax for a single agent. This means that on average, even the agent that is excluded from the optimization would tend to get a comparable or better utility than it can expect in the VCG mechanism!

The curves shown in FIG. 8 are not specific to this particular type of problem; for example, we have obtained almost identical curves on randomly generated weighted graph coloring examples where relations assign utility according to the difference in colors in a graph coloring scenario.

Thus, in spite of providing a suboptimal solution, overall the method can be expected to be significantly more advantageous to the agents. It applies to any social choice problem with quasilinear utilities and risk-neutral agents.

6 EXTENSIONS AND VARIANTS

6.1 Using Randomization and Distributing the Unfairness

Note that the solution chosen in Mechanism 1 necessarily treats the agents of the excluded group very differently from the others. In many applications, such unfairness may not be acceptable. We now show how the effects of the choice can be better distributed among the agents.

We consider first the following variation of Mechanism 1, illustrated in FIG. 5A and FIG. 5B:

Mechanism 2

At Step 305, each agent $A_i \in A$, $i=1 \ldots k$ is asked to state its relations.

Next, at Step 310, the system chooses m excluded groups $E_1, \ldots, E_m$, each comprising at least one agent. Let $R_{E_i} = \cup_{A_l \in E_i} R_l$.

Next, at Step 315, for $l=1 \ldots m$, the system computes the assignments:

$$S_l = V^*_{R/R_{E_l}}$$

Optionally, if there are several optimal assignments, the system chooses the one with the best utility according to the relations in $R_{E_i}$.

In Step 320, for each $S_l$, the system computes the payments from each agent $A_i$ to agents $A_j$ in $E_l$ as tax payments associated with the assignment $S_l$.

In Step 325, the system divides up these payments among the agents in $E_l$ to obtain individual payments $Pay(A_i \to A_j, l)$ for each i and j from $1 \ldots k$.

Next, at Step 330, the system chooses a random number $l \in [1 \ldots m]$ according to a probability distribution $\{p_1, \ldots, p_m\}$ and implements solution $S_l$.

Finally, at Step 335, the system makes each agent $A_i$ pay to agent $A_j$ the average tax:

$$\text{pay}(A_i \to A_j) = \sum_{l=1}^{m} p_l \cdot \text{pay}(A_i \to A_j, l)$$

(since solution $S_l$ is chosen with probability $p_l$).

For example, assuming 4 excluded groups each containing a single agent: $E_i = \{A_i\}$ and a uniform probability distribution $\{p_1, \ldots, p_4\} = \{¼, \ldots, ¼\}$, the net payments (sum of payments paid and received) in Mechanism 2 are:

| Agent | $tax_1$ |
|---|---|
| $A_1$ | ¼[2 − (−1) + 2 − 3 + 2 − 4] = 0 |
| $A_2$ | ¼[−1 − 2 + 0 − 2 + 5 − 5] = +³¹⁵⁄₄ |
| $A_3$ | ¼[3 − 2 + 2 − 0 + 3 − 5] = ¼ |
| $A_4$ | ¼[4 − 2 + 5 − 5 + 5 − 3] = 1 |

For risk-neutral agents, Mechanism 2 is indistinguishable from Mechanism 1.

We therefore have the following results:

Proposition 6 For Risk-Neutral Agents, Mechanism 2 is Incentive-Compatible.

Proof. Follows from Proposition 3.

Proposition 7 For risk-neutral agents, Mechanism 2 is individually rational.

Proof. Follows from Proposition 4.

Note, however that Mechanism 2 is not individually rational ex-post, as particular choices of random number may cause an agent to have negative total utility. However, the result is also stronger than interim, since it would still be individually rational to participate even if the agent knew all other agents' declarations.

We also have that:

Proposition 8 Mechanism 2 is budget balanced ex-post.

Proof. Follows from Proposition 5 and is obvious since no taxes are paid to any outside agents.

When excluded groups consist of single agents and the probability distribution $p_1, \ldots, p_k$ is uniform, i.e. each $p_i = 1/k$, then the payment computations in Mechanism 2 can be considerably simplified. Consider the payments between Agents $A_i$ and $A_l$. $A_i$ pays to $A_j$:

$$p_l \cdot \text{VCGtax}_{-l}(A_i) = p_l \sum_{r_m \in R \setminus (R_i \cup R_l)} r_m(V^*_{R \setminus (R_i \cup R_l)}) - r_m(V^*_{R \setminus R_l})$$

and $A_l$ pays to $A_i$:

$$p_i \cdot \text{VCGtax}_{-i}(A_l) = p_i \sum_{r_m \in R \setminus (R_i \cup R_l)} r_m(V^*_{R \setminus (R_i \cup R_l)}) - r_m(V^*_{R \setminus R_i})$$

Thus, if $p_i = p_l$, we can cancel the first terms and replace this by the following payments:

$$A_i \to A_l: \; p_l \sum_{r_m \in R \setminus (R_i \cup R_l)} -r_m(V^*_{R \setminus R_l})$$

$$A_l \to A_i: \; p_i \sum_{r_m \in R \setminus (R_i \cup R_l)} -r_m(V^*_{R \setminus R_i})$$

These payments no longer include the optimal assignments $V_{R \setminus (R_i \cup R_j)}$, and thus require solving only k instead of $(k+1)k/2$ optimization problems to compute the taxes.

A major drawback of Mechanism 2 is that it systematically puts one and the same agent at a disadvantage. This may make it inapplicable in many practical scenarios: for example, when allocating slots to different airlines, it may not be acceptable for one airline to not be considered at all. It would be much more acceptable if the airline were excluded only for certain parts of the optimization.

Assume that we partition the set of relations R contributed by all agents into o disjoint subsets $R^1, \ldots, R^o$ such that their union is equal to the original set of relations: Let $R_{E_i}^j$ be the relations in $R^j$ belonging to a group of agents $E_i$:

$$R_{E_i}^j = \bigcup_{A_k \in E_i} R^j \cap R_k$$

The idea is to make separate random decisions on which agent's relations to leave out for each of the subsets. To distribute the unfairness, it is best to choose the partition so that each agent's relations are distributed among the subsets as much as possible. The following mechanism, illustrated in FIG. 6A and FIG. 6B, does this:

Mechanism 3

At Step 405, each agent $A_i \in A$, $i=1 \ldots k$ is asked to state its relations.

Next, at Step 410, the system chooses m excluded groups $E_1, \ldots, E_m$, each comprising at least 1 agent. Let $R_{E_j} = \bigcup_{A_l \in E_j} R_l$.

Next, at Step 415, for $l=1 \ldots m$ it computes the assignments:

$$S_l = V^*_{R \setminus R_{E_l}}$$

Optionally, if there are several optimal assignments, the system chooses the assignment with the best utility according to the relations in $R_{E_l}$.

In Step 420, for each $S_l$, the system computes the payments from each agent $A_i$ to agents $A_j$ in $E_l$ as tax payments associated with the assignment $S_l$.

In Step 425, the system divides up these payments among the agents in $E_l$ to obtain individual payments $\text{Pay}(A_i \rightarrow A_j, l)$ for each i and j from $1 \ldots k$.

Next, in Step 430, the system makes each agent $A_i$ pay to each other agent $A_j$ the average tax:

$$\text{pay}(A_i \rightarrow A_j) = \sum_{l=1}^{m} p_l \cdot \text{pay}(A_i \rightarrow A_j, l)$$

The system then proceeds to Step 435, where the system chooses o independent random numbers $l_1, \ldots, l_o$ according to a distribution $p_1, \ldots, p_m$.

Next, at Step 440, the system computes R' as:

$$R' = \bigcup_{j=1}^{o} (R^j \setminus R_{E_{l_j}}^j)$$

using the partitioning of R into o disjoint subsets $R^1, \ldots, R^o$ described above.

Finally, at Step 445, the system computes the optimal assignment:

$$S = V^*_{R'}$$

This is the assignment that the system will implement.

To prove properties of this mechanism, we first show the following Lemma:

Lemma 1 Provided that all agents have the same prior distribution μ of relations and utilities, the results of Mechanism 2 and Mechanism 3 are indistinguishable to a risk-neutral agent.

Proof. When all relations are drawn from an identical distribution, it is impossible to tell whether all removed relations come from the same group of agents, i.e. we have as relations $R \setminus R_{E_j}$, or if they came from different groups of agents, i.e. we have $R' = \bigcup_{j=1}^{m} (R^j \setminus R_j^j)$. Thus, the two cases are indistinguishable in expectation.

Thus, we can easily show the following propositions:

Proposition 9 Provided that agents have the same prior distribution μ of relations, and agents are risk-neutral, Mechanism 3 is interim incentive-compatible and individually rational.

Proof. Follows from Lemma 1 and Propositions 6 and 7.

Proposition 10 Mechanism 3 is ex-post budget balanced.

Proof. Follows from the fact that payments are identical to those in Mechanism 2 and Proposition 8.

In practice, there are many situations where agents' relations and utilities fall in the same distribution. For example, airlines can obtain similar utilities from using airport slots. In these cases, Mechanism 3 offers an attractive possibility to distribute the impact of the random decisions among the agents.

It may also be possible to enforce similar distributions, for example by limiting the maximum or average amount of utility allowed in a relation to some value that may be set to be reasonable for a given application.

In Mechanism 3, it can still happen that the same agent is excluded in each of the optimizations. An even stronger sense of fairness can be imposed by variants such as the following:

Mechanism 4 Identical to Mechanism 3 except that:
  the number of subsets o must be chosen to be an integer multiple of the number of agent groups m.
  the random numbers $l_1 \ldots l_o$ generated in step 445 of Mechanism 3 are restricted to combinations where each number occurs exactly o/m times. All permutations occur with the same probability.

Mechanism 4 has the same properties as Mechanism 3 as long as all agents have the same a priori distribution of relations and all moments of this distribution involving relations spread over more than m/k sets are zero. This is likely to be satisfied as long as subsets are chosen to represent independent aspects of the problem, such as for example all relations involving certain subsets of variables.

6.2 Varying Utility Gains among Agents

In various embodiments of the invention, Mechanisms 1 through 4 treat all agents equally. As we have seen in the examples, these mechanisms have the tendency to equalize the expected utility agents can expect to get from the optimization.

In many situations, such an equal treatment may not be desirable. For example, when we allocate slots to airline companies, we may not want to give the same expected utility to an airline that operates 200 airplanes as to one that operates only 10. We also would want to avoid "dummy" agents that have no interest in the optimization but participate simply to collect the tax surplus.

For using Mechanisms 1 through 4 in such situations, we can use the possibility of choosing excluded groups comprising more than one agent. More specifically, excluded groups should be chosen such that the sums of the expected utilities for agents in each group are comparable to each other. Note that the when there are groups of agents, the simplification of payments in Mechanism 2 may not apply.

Assume that in the example given earlier, agents $A_2$ and $A_3$ are considered to be only half as important as $A_1$ and $A_4$. Thus, in one embodiment, we would group $A_2$ and $A_3$ into a single group. In an application of Mechanism 1 where each of the three groups was excluded randomly with equal probabiility, we would have the following payments:

| Solution | tax($A_1$) | tax($A_2$) | tax($A_3$) | tax($A_4$) |
|---|---|---|---|---|
| $\upsilon^*_{R \setminus R_1} = (A, C, B)$ | −5 | 2 | 1 | 2 |
| $\upsilon^*_{R \setminus (R_2 \cup pR_3)} = (B, C, B)$ | 2 | | −4 | 2 |
| $\upsilon^*_{R \setminus R_4} = (C, C, C)$ | 0 | 0 | 0 | 0 |
| E[tax] = | −1 | (2 − x)/3 | (1 − y)/3 | 4/3 |

When the mechanism choses the second solution, agents $A_2$ and $A_3$ are jointly paid 4 units. They can distribute these according to their importance into parts x and y such that x+y=4. Note that the grouping also affects the expected tax of the other agents as it emphasizes their conflicting interests.

Since the second solution optimizes a smaller part of the relations, the total expected utility slightly decreases to $8/3$.

6.3 Continuous Operation

In many applications, the social choice problem may have a continuously evolving nature. For example, when allocating slots at airports, new slots and requests for slots appear continuously as time progresses. At the same time, the assignment of some slots has to be committed to as their time approaches. To model such situations, we may define:

Definition 3 A discrete evolving MCOP is a tuple <A(t), X(t), D(t), C(t), R(t)> that forms an MCOP for each time t and where the following conditions hold:

variables appear only in one temporal interval, i.e. if x is present at two times $t_1$ and $t_2$ then it is present at all other times $t_i$ that fall between them:

$$x \in X(t_1) \wedge x \in X(t_2) \Rightarrow x \in X(t_i), t_1 \leq t_i \leq t_2$$

D(t), C(t) and R(t) contain all domains, constraints and relations pertaining to variables in X(t).

A(t) is the set of all agents that are associated with some relation in R(t).

We assume that time is normalized so that it progresses in increments of 1 and call $X_c(t)=X(t)-(X(t) \cap X(t+1))$ the committed variables at time t and $X_a(t)=X(t)-(X(t) \cap X(t-1))$ the appearing variables at time t.

We assume that all agents have the same state of knowledge and know the current problem but not the variables, constraint and relations that will be added to it in the future.

At each time increment, the set of constraints and relations has to be adapted to the change in the set of variables. Specifically:

any constraint in C(t−1) and relation in R(t−1) that involves only variables in $X_c(t)$ is no longer part of C(t) and R(t), respectively.

every constraint in C(t−1) and relation in R(t−1) that involves both variables in $X_c(t)$ and X(t) is transformed into its projection formed by setting all variables from $X_c(t)$ to their decided values and eliminating them from the constraint or relation.

all other constraints and relations are carried over from C(t−1) and R(t−1) to C(t) and R(t).

all constraints involving variables in $X_a(t)$ are added to C(t). The agents are asked to state all relations involving variables in $X_a(t)$.

If necessary, the set of agents is adjusted to contain exactly those that own a relation in R(t). The set of domains is adjusted to correspond to the variables in X(t).

Any one of Mechanisms 1 through 4 can be adapted to deal with the evolving problem in the following way. The modified mechanism maintains a set $X_o$ of open variables, a set $X_d=X(t)-X_o$ of decided variables, and a set $C_d$ of unary constraints on the decided variables that constrains the decided variables to the decided values. Initially, $X_o=X(0)$, $X_d=\phi$ and $C_d=\phi$.

At each time step t, the modified mechanism performs the following operation:

If $X_o \cap X_c(t)=\phi$, implement the decisions as prescribed by $C_d(t)$;

otherwise, run the mechanism on the problem <A(t), X(t), D(t), C(t) $\cup C_d(t)$, R(t)>, set $X_d(t) \leftarrow X(t)$, $X_o(t) \leftarrow \phi$ and $C_d(t) \leftarrow$ constraints expressing the decided values, and make agents pay the computed payments.

As an example, consider a peer-to-peer system where information is stored as sets of files on different servers. The social choice problem is to decide what set of files is stored on what server. Thus, there is one variable for each set of files whose domain is the set of servers it can be stored on. We assume that servers get paid for delivering information to requesters; the difference between the payment and the cost of storing a set of files is the agent's utility. This gives rise to the relations stated by the agents.

Let the network consist of three servers represented by agents $A_1$, $A_2$ and $A_3$. Each server has a capacity of at most two sets of files, and can store them at the following costs:

| | Agent | | |
|---|---|---|---|
| | $A_1$ | $A_2$ | $A_3$ |
| Cost | 6 | 7 | 8 |

Requests for storing file sets are received incrementally. Assume that at time t=0, two sets of files, $f_1$ and $f_2$, need to be allocated. Each has an expected revenue of 10. Furthermore, $f_1$ and $f_2$ have a significant amount of overlap, so that storing them on the same server will result in a cost saving of 5. This gives rise to the following social choice problem:

variables: $x_1$ and $x_2$
domains: $d_1=d_2=\{1, 2, 3\}$
constraints: no more than two variables can be assigned the same value
relations: for agent $A_i$, $R_i$ consists of the following 3 relations:

$$\begin{cases} \text{for } j = 1 \ldots 2 : r_{ij}(x_j) = 10 - (i+5) = 5 - i \text{ if } x_j = i, 0 & \text{otherwise;} \\ r_{i3}(x_1, x_2) = 5 \text{ if } x_1 = x_2 = i, 0 & \text{otherwise} \end{cases}$$

Thus, initially $X_o \leftarrow \{X_1, X_2\}$, $X_d \leftarrow \phi$, $C_d \leftarrow \phi$. At time t=1, we need to have the set of files $f_1$ accessible so we need to decide definitely where it is going to be stored Thus, $X_c(1)=\{x_1\}$, which overlaps with $X_o$ so we invoke Mechanism 1 to generate a chosen solution. For example, in one embodiment Mechanism 1 would consider the following solutions:

| Solution | Assignments | Utilities | Payments |
|---|---|---|---|
| $S_1$ | $x_1 = 2$ | $U(A_1) = 0$ | pay($A_1$, 1) = −9 |
| | $x_2 = 2$ | $U(A_2) = 11$ | pay($A_2$, 1) = 9 |
| | | $U(A_3) = 0$ | pay($A_3$, 1) = 0 |

-continued

| Solution | Assignments | Utilities | Payments |
|---|---|---|---|
| $S_2$ | $x_1 = 1$ | $U(A_1) = 13$ | $pay(A_1, 2) = 9$ |
| | $x_2 = 1$ | $U(A_2) = 0$ | $pay(A_2, 2) = -9$ |
| | | $U(A_3) = 0$ | $pay(A_3, 2) = 0$ |
| $S_3$ | $x_1 = 1$ | $U(A_1) = 13$ | $pay(A_1, 3) = 11$ |
| | $x_2 = 1$ | $U(A_2) = 0$ | $pay(A_2, 3) = 0$ |
| | | $U(A_3) = 0$ | $pay(A_3, 3) = -11$ |

Assume that $S_2$ is chosen; we thus have the new problem $X(1)=\{x_2\}$ with the additional constraint that $x_2=1$ and a capacity of Agent 1 reduced to 1 file set. We set $X_o \leftarrow \phi$, $X_d \leftarrow \{x_1, x_2\}$, and $C_d$ contains the constraint that $x_2=1$ and the capacity of Agent 1 is reduced to 1 file set.

At time $t=2$, we receive the request for $f_3$ and generate a new variable $x_3$, so $X_o \leftarrow X_d(2)=\{x_3\}$ and $X(2)=\{x_2, x_3\}$ with the corresponding domains, constraints and relations. Assume that each Agent $A_i$, $i=1\ldots 3$ states the following relations involving $x_3$:

$$r_{i4}(x_3) = 10-(i+5) = 5-i \text{ if } x_j = i, \text{ 0 otherwise;}$$

$$r_{i5}(x_2, x_3) = 7 \text{ if } x_2 = x_3 = i; \text{ 0 otherwise}$$

where the second constraint again reflects cost savings due to overlaps in the files and gains in returns due to possible cross-selling. As $X_c(2)=\{\ \}$, no computation is necessary at this stage.

At time $t=3$, we have to commit on where to store both $f_2$ and $f_3$, so that $X_c(3)=\{x_2, x_3\}$ and Mechanism 1 is run again on the set of variables $X_o = \{x_3\}$. Note that because of the previously decided assignment, the constraints now fix the remaining capacity of Agent $A_1$ to 0. Thus, the three solutions that would be considered by Mechanism 1 are:

| Solution | Assignments | Utilities | Payments |
|---|---|---|---|
| $S_1$ | $x_3 = 2$ | $U(A_1) = 0$ | $pay(A_1, 1) = -2$ |
| | | $U(A_2) = 3$ | $pay(A_2, 1) = 2$ |
| | | $U(A_3) = 0$ | $pay(A_3, 1) = 0$ |
| $S_2$ | $x_3 = 3$ | $U(A_1) = 0$ | $pay(A_1, 2) = 0$ |
| | | $U(A_2) = 0$ | $pay(A_2, 2) = 0$ |
| | | $U(A_3) = 2$ | $pay(A_3, 2) = 0$ |
| $S_3$ | $x_3 = 2$ | $U(A_1) = 0$ | $pay(A_1, 2) = 0$ |
| | | $U(A_2) = 3$ | $pay(A_2, 2) = 0$ |
| | | $U(A_3) = 0$ | $pay(A_3, 2) = 0$ |

The mechanism might for example choose $S_3$ and thus implement $x_3=2$ with no further payments. The total utility of all agents is 16. We set $X_o \leftarrow \phi$.

Note that due to the incremental discovery of the problem, this solution is not optimal overall. A better solution could be obtained by also changing $x_2$ from its earlier decided value of $x_2=1$ to $x_2=2$. This would result in a total utility of 17. However, such a reassignment must be ruled out as it could lead to violations of individual rationality. In the example, as a result of the first invocation of Mechanism 1, Agent $A_1$ has paid 9 units of tax. However, if $x_2$ is subsequently reassigned, it will only get a utility of 4 from the decision, resulting in a total utility of $-5$ and violating its individual rationality. Treating the assignemnt of $x_1$ in isolation from $x_2$ would fix individual rationality but would no longer be incentive compatible, as the relation with $X_2$ would not be considered in the initial optimization.

This does not rule out that other mechanisms could be put in place where agents could individually negotiate a swap of the assignments if they can mutually benefit from this.

6.4 Social Choice without Payments

When the excluded group contains all but a single agent $A_i$, the remaining optimization problem will contain only relations of the single agent $A_i$. As there are no other agents in this optimization problem, the agent cannot cause any utility loss and thus does not have to pay any tax.

This can be used to adapt Mechanisms 1 through 4 so that no tax is paid. For example, we can choose k excluded groups $E_1, \ldots, E_k$ such that $E_i = \{A_1, \ldots, A_{i-1}, A_{i+1}, \ldots, A_k\}$. When $E_i$ is chosen as the excluded group, it is likely that there will be many solutions that are equally good for the relations $R_i$ considered in this optimization. We can now apply the same mechanism recursively to the same social choice problems, but only with agents in the excluded groups and with the additional constraint that only solutions that are best for $R_i$ can be chosen. We can thus obtain a mechanism for solving a social choice problem without any taxes. This may be particularly advantageous in applications that do not have a payment infrastructure, such as certain load-balancing scenarios in networks.

7 SOCIAL COMPROMISE SCENARIOS

In general, social choice problems are scenarios where the decision variables are controlled collectively by the community of agents and are not restricted by individual agents. When decision variables are partially or completely controlled by some of the agents, making these decisions based on the outcome of a social choice mechanism may give these agents a lower utility than they could get by acting alone. We call such a scenario a social compromise problem.

An example of a social compromise problem is a reverse auction. In a reverse auction, a set of resources needs to be produced by the set of agents. In return, the agents will in general collect a payment that makes it rational for them to produce this resource. Reverse auctions are common for example in construction, where tasks are allocated to contractors through a bidding process, or in procurement, where suppliers are selected to supply items based on a bidding process. Certain scenarios would benefit from making such auctions budget-balanced. For example, when a contract requires a consortium of companies to do extra remedial work, it may be useful to assign this work to the members using a reverse auction process, but there is no money to generate payments to the members for this work.

Mechanisms 1 through 4 can be used for social compromise problems by taking into account the fact that the agent excluded from optimization will not be required to set decision variables it controls in the sense of the joint decision. Thus, any assignments which would require the agent to do so will be excluded from the optimization.

Furthermore, the tax payments become negative, so that the tax is now paid from the agents in the excluded group to the remaining agents. We call this negative tax the reverse VCG tax, or rVCGtax in short. To illustrate how the mechanisms are used for this scenario, the following details the adaptation of Mechanism 1. This adaptation is also depicted in FIGS. 7A and 7B.

Mechanism 5

In Step 505, each agent $A_i \square A$, $i=1\ldots k$ is asked to state its relations.

Next, in Step 510, the system chooses an excluded group E of one or more agents using a method that does not depend on the relations stated by the agents, for example a random choice.

Next, in Step 515, the system restrict the variable domains of variables influenced by agents in E to contain only values that are these agents would allow them to be set to. Within these possibilities, the system computes the assignment:

$$S_E = V^*_{R \setminus R_E}$$

where $R_E = \bigcup_{A_j \in E} R_j$. Optionally, if there are several equally optimal assignments, the system chooses the one with the best utility according to the relations in $R_E$. The same mechanism for social choice can be applied recursively to the subproblem of making this choice in a way that is incentive-compatible for agents in E.

Next, the system proceeds to Step 520, where it computes the taxes that agents in E have to pay to each agent $A_i$ as the reverse VCGtax for the solution $S_E$:

$$\text{pay}(A_i \to E) = rVCGtax_{-E}(A_i)$$
$$= \sum_{r_m \in R \setminus (R_i \cup R_E)} r_m(V^*_{R \setminus R_E}) - r_m(V^*_{R \setminus (R_i \cup R_E)})$$

where the assignments $V^*_{R \setminus R_E}$ and $V^*_{R \setminus (R_i \cup R_E)}$ are computed after restricting the domains of variables influenced by agents in E and E ∪ {$A_i$}, to values that these agents would allow them to take, as explained above.

Next, in Step 525, the system computes, for each of the taxes computed in Step 520, how they should be split among the agents in E according to some predetermined scheme that does not depend on the relations they declared.

Finally, in Step 530, the system implements the chosen assignment $S_E$ and make agents pay the payments computed in steps 520 and 525.

Analogously to Mechanism 1, Mechanism 5 can be shown to be budget-balanced and incentive-compatible. It can also be adapted to work with a first-price tax mechanism. However, it is not always guaranteed to be individually rational. This property depends on the structure of the agent's utilities and the way in which the excluded agents are chosen.

An example of an application where Mechanism 5 is individually rational, consider the following example of a revenue-free reverse auction. Assume that a set of resources, for example tasks or goods, must be collectively produced by a set of agents. This is a social compromise problem because each agent would prefer to produce nothing, and has to be compensated for the work it does for the group. Each resource has an associated variable that takes as value the agent that is chosen to produce the resource. An agent has an influence on each variable in that it can disallow it to be set to the value where it has to produce the corresponding resource. We assume that all agents have equal duties, i.e. they can be called upon to produce any of the resources with the same probability. This means that the expected utility loss to agent $A_i$ due to the compromise is 1/k times the cost to agent $A_i$ of producing all the resources. A mechanism is individually rational for $A_i$ if it gives it a better expected utility.

We can solve this social compromise problem using Mechanism 5 where agents are excluded individually, i.e. the excluded group E always consists of one agent, and each agent is chosen with the same probability. This instantiation of the mechanism is individually rational for each agent $A_i$ for the following reasons:
 if $A_i$ is not in the excluded group E, the mechanism is a reverse auction which is individually rational for $A_i$.
 with probability 1/k, $A_i$ is in the excluded group E. In this case, it has not utility loss from the compromise, but has to pay all the reverse VCG taxes generated by the reverse auction involving the remaining agents. This is individually rational if the payment is less then the cost to $A_i$ of producing all resources itself.

Consider the reverse VCGtax paid to another agent $A_j$, and let it produce a bundle of resources $b_j$ in the proposed solution. There are two possibilities:
 the payment to $A_j$ is lower than the cost of producing the resources in $b_j$ for $A_i$. Thus, $A_i$ is better off than it if had to produce the resources in $b_j$.
 the payment is higher than its cost. Consider the equally likely scenario where the excluded group contains agent $A_j$. In this scenario, $A_i$ would be chosen to produce the resources in $b_j$ and receive exactly the same payment it would make to $A_j$ when E={$A_i$}. Thus, the net utility loss is no greater than the cost to $A_i$ of producing the goods in $b_i$.

Thus, the total expected net payment is no greater than the utility loss if $A_j$ had to produce all the goods itself, and so it is individually rational for $A_i$ to participate.

Likewise, adaptations of Mechanisms 2 through Mechanism 4 that take into account the fact that certain assignments cannot be considered in the optimization and that tax payments are negative can be applied to this and other scenarios while maintaining the desirable properties including individual rationality.

8 OTHER APPLICATION SCENARIOS

We now show several other application scenarios which give an idea of the scope of problems to which the mechanisms we described above can be applied. This list is only indicative and by no means exhaustive.

8.1 Airport Slot Allocation

Airports divide the use of each of their runways into slots such that each slot corresponds to one potential takeoff and landing. For example, if an interval of at least 60 seconds is needed between to successive takeoffs or landings on the same runway, the airport has one slot available for each runway for each minute of the day.

To avoid systematic delays, airline schedules must be set up so that airports have sufficient slots to accomodate the takeoffs and landings associated with each schedule. This creates a social choice problem: the airlines (which may, in this case, be regarded as "agents") have to agree on which airline and flight uses each slot so that it is used at most once. The variables x1 ... xn of the social choice problem are the slots, and their domains are all the flights that airlines might want to assign to them. Furthermore, there are constraints that determine that each flight can be assigned to only one slot.

The problem can be solved either for a single airport or for a network of airports; recognizing that slots for takeoffs at a departure airport have to be coordinated with slots at the corresponding arrival airport of a flight.

Each airline will attach a monetary utility to using a slot or combination of slots for its flights, which corresponds to a part of the expected profit it stands to make by operating the intended flight(s). These utilities are expressed as relations.

The mechanisms of the present invention can now be used to find an assignment of slots to flights so that no slot is assigned to more than one airline and flight, that it is in airlines best interest to report their relations truthfully, and that the combined utility is optimized. The agents (e.g. airlines) pay corresponding taxes to each other. Some airlines are significantly smaller than others and thus have less operations and may stand to gain disproportionately from tax payments they receive; this can be accomodated by grouping the smaller airlines into groups that combined have a similar size.

Similar results could be achieved using auction mechanisms. However, these would create an incentive for the airport to restrict the supply of slots at critical times to drive up its revenue. In the scheme proposed here, the airport has no incentive to restrict traffic; in fact it is in its best interest to accomodate as much traffic as possible to increase revenue from landing fees. Also note that when there is no conflict between desires for slots, the optimal solution is chosen and there are no payments between agents.

An airport may also set aside a number of slots for demands that only become known in the short term. These may be distributed using the mechanism of this invention periodically to assign the slots that are available in the next time period, using the method for continuous operation described earlier.

Similarly, the methods of this invention can be used to allocate positions to ships in a port, frequencies to radio operators, capacity in a communication or train network, or any other public resource to agents who require it.

8.2 Allocating Capacity in a Network

In a liberalized electricity market, several suppliers sell electricity to a market of consumers. In order to balance demand and supply, they need to solve a social choice problem whose variables are the amount of power that each supplier produces, and whose domains are the limits of generation capacity for each supplier. The problem is constrained by the capacity of the distribution network which can give rise to complex constraints on the social choice problem. Additional constraints may come from the ability of powerplants to change their generation level within a given time interval.

Each producer attaches varying utility to different levels of production and models this by relations involving the value of generation assigned to him.

The problem can be solved by applying one of the mechanisms of this invention in continuous operation to the situation generated by the current load distribution, for example at intervals of d minutes each. The suppliers then declare the utilities they get out of producing at the different production levels for the next d minutes. Every time the mechanism runs, the producers have to make the side payments as determined by the mechanism.

The problem could be solved by a prior art pure auction mechanism but this would give the opportunity to the network operator to manipulate the capacity of the network in order to increase revenue obtained from this auction. For example, it may often be profitable to shut down some of the network's capacity as the increase in prices will offset the loss of revenue due to reduced usage of the network. In one embodiment of this invention, the network owner gets no revenue from the contention, but instead gets his revenue from transmission charges that are independent of congestion. He thus has the incentive to provide the necessary capacity to maximize usage of the network.

Similarly, the methods of this invention can be used for allocating capacity in a gas distribution network, or other network scenarios with interdependencies between parameters of different agents.

8.3 Dividing an Estate Among Heirs

It is often difficult to split up an estate among heirs who may not be honest about how much they actually value the different items within the estate. Here, the social choice problem has as variables the major items that make up the inheritance and as domains the heirs that could receive them. Legal constraints may pose further restrictions on feasible allocations. Each heir attaches a certain utility to each item or combination of items and expresses these as relations. The law may require that certain heirs have stronger rights to the assets and this may require that the lesser ones to be grouped in groups so that they carry equal weight.

One of the social choice mechanisms described herein can now be used to solve the social choice problem in an incentive-compatible way without generating any revenue for a party other than the heirs. Thus, there is no incentive for anyone to manipulate the outcome.

8.4 Multi-Party Scheduling

A project, for example in construction, may involve many contractors. As their work is highly interdependent, they need to agree on a common schedule. The social choice problem has one variable for each task that indicates when it will be carried out. There are precedence and capacity constraints on the feasible solutions. Contractors have different costs depending on when they can carry out the work and express this as utilities in relations.

The mechanisms of this invention can then be applied to find an assignment and compute side payments for the contractors. Since the side payments do not generate any revenue for a third party, there is no incentive for anyone to manipulate the decision process.

Similarly, the mechanisms can be applied to any decision in a virtual enterprise, for example regarding product design and business or financial strategies.

9 CONCLUSION

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

I claim:

1. A computer system for determining which of a plurality of different outcomes should be implemented, said computer system comprising:
    memory; and
    a processor that is connected to communicate with said memory, wherein said computer system is configured for:
    (A) receiving, from a first party of a plurality of parties, a first-party utility value that said first party would associate with at least one of said plurality of different outcomes;
    (B) receiving, from a second party of said plurality of parties, a second-party utility value that said second party would associate with at least one of said plurality of different outcomes;
    (C) receiving, from a third party of said plurality of parties, a third-party utility value that said third party would associate with at least one of said plurality of different outcomes;

(D) identifying, in a substantially random manner, at least one of said plurality of parties as one of an excluded group of parties, wherein:
 (1) said excluded group of parties comprises at least one party; and
 (2) said identifying step at Step (D) comprises identifying, in a substantially random manner, at least said first party as one of said excluded group of parties;
(E) identifying a candidate group that comprises each of said plurality of parties other than said excluded group of parties; and
(F) determining which particular one of said plurality of outcomes should be selected based primarily on a set of utility values that comprises: (1) said second-party utility value; (2) said third-party utility value; and (3) a respective utility value provided by each of any other parties within said candidate group, wherein:
 said determining step at Step (F) is not substantially based on any utility value received, from a party within said excluded group of parties, at any of said Steps (A)-(C),
 said identifying step at Step (D) is not substantially based on any utility value received, from a party within said excluded group of parties, at any of said Steps (A)-(C),
 said system is further configured for calculating a side payment that at least one party within said candidate group must make to said excluded group, and
 said system is further configured for indicating that said at least one party within said candidate group must make said side payment to said excluded group.

2. The computer system of claim 1, wherein said side payment comprises a VCG tax.

3. The computer system of claim 1, wherein said side payment comprises a first-price tax.

4. The computer system of claim 1, wherein said computer system is further configured for indicating that each party within said candidate group must make said side payment to said excluded group.

5. The computer system of claim 1, wherein said side payment is determined, at least in part, based on said second party utility value.

6. The computer system of claim 1, wherein said side payment comprises an average of a plurality of VCG taxes.

7. The computer system of claim 1, wherein said side payment comprises an average of a plurality of first price taxes.

8. The computer system of claim 1, wherein said excluded group of parties consists of said first party.

9. The computer system of claim 8, wherein:
 said computer system is configured for determining which single one of said plurality of parties should comprise said excluded group of parties using a substantially random method in which each of said plurality of parties has substantially the same chance of being selected to comprise said excluded group of parties.

10. The computer system of claim 9, wherein said computer system is further configured for:
(G) calculating a side payment that at least one of said plurality of parties must make to another of said plurality of parties, and wherein:
 said side payment is calculated based on utility values associated with outcomes chosen when the excluded group consists of a single party.

11. The computer system of claim 9, wherein said computer system is further configured for:
(G) calculating a side payment that said second party must make to said first party, and wherein:
 said second party utility value is a utility value associated with an outcome under which said first party is an excluded group, and
 said side payment is calculated based on said second party utility value.

12. The computer system of claim 1, wherein said excluded group comprises more than one of said plurality of parties.

13. The computer system of claim 1, wherein said plurality of different outcomes comprises a plurality of different outcomes of a determination of which of said plurality of parties should own a particular item.

14. The computer system of claim 1, wherein said plurality of different outcomes comprises a plurality of different outcomes of a determination of which of said plurality of parties should have a pre-determined set of rights related to a resource.

15. The computer system of claim 1, wherein said plurality of different outcomes comprises a plurality of different outcomes of a determination of a common parameter that affects at least one of the parties.

* * * * *